US012761957B2

(12) United States Patent
Patel et al.

(10) Patent No.: US 12,761,957 B2
(45) Date of Patent: Oct. 13, 2026

(54) EXTENSIBLE CONTENT OBJECT METADATA

(71) Applicant: Box, Inc., Redwood City, CA (US)

(72) Inventors: Kishan Bharat Patel, San Mateo, CA (US); Varun Parmar, Los Altos, CA (US); Benjamin John Kus, Alameda, CA (US); Hieu Minh Nguyen, Redwood City, CA (US); John Huffaker, San Francisco, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 16/553,144

(22) Filed: Aug. 27, 2019

(65) Prior Publication Data

US 2020/0065313 A1 Feb. 27, 2020

Related U.S. Application Data

(60) Provisional application No. 62/723,435, filed on Aug. 27, 2018.

(51) Int. Cl.
*G06F 15/16* (2006.01)
*G06F 9/50* (2006.01)
(Continued)

(52) U.S. Cl.
CPC .......... *G06F 9/5027* (2013.01); *G06F 16/254* (2019.01); *G06F 16/288* (2019.01);
(Continued)

(58) Field of Classification Search
None
See application file for complete search history.

(56) References Cited

U.S. PATENT DOCUMENTS

| | | | |
|---|---|---|---|
| 6,662,188 B1 * | 12/2003 | Rasmussen | G06F 16/289 707/999.102 |
| 9,148,425 B2 | 9/2015 | Rowe et al. | |

(Continued)

FOREIGN PATENT DOCUMENTS

| | | |
|---|---|---|
| CN | 108256788 | 7/2018 |

OTHER PUBLICATIONS

Bellini, et al. A Workflow Model and Architecture for Content and Metadata Management Based on Grid Computing. ECLAP 2013, pp. 118-127. (Year: 2013).*

(Continued)

*Primary Examiner* — Boris Gorney
*Assistant Examiner* — Shelly X Qian
(74) *Attorney, Agent, or Firm* — Vista IP Law Group, LLP

(57) ABSTRACT

Methods, systems and computer program products for managing content objects in a content management system. A metadata template is assigned to a content object of the content management system. Extensible metadata pertaining to the content object is allocated in accordance with the assigned metadata template. Various operations over the content object result in population of the allocated extensible metadata. When the content object is subjected to a workflow, the execution flow and/or the form of responses associated with execution of the workflow are informed by the populated extensible metadata. A single content object can take on an association with multiple sets of extensible metadata and each set of extensible metadata can take on association with a respective workflow.

26 Claims, 12 Drawing Sheets

(51) Int. Cl.
*G06F 16/25* (2019.01)
*G06F 16/28* (2019.01)
*G06Q 10/101* (2023.01)
*H04L 67/10* (2022.01)
*H04L 67/53* (2022.01)
(52) U.S. Cl.
CPC ............ *G06Q 10/101* (2013.01); *H04L 67/10* (2013.01); *H04L 67/53* (2022.05)

(56) References Cited

U.S. PATENT DOCUMENTS

| | | | |
|---|---|---|---|
| 10,038,731 | B2 | 7/2018 | Pearl et al. |
| 10,176,435 | B1 | 1/2019 | Sarkar et al. |
| 10,331,416 | B2 | 6/2019 | Chaudhry et al. |
| 10,540,624 | B2 | 1/2020 | Hui et al. |
| 10,853,718 | B2 | 12/2020 | Gottin et al. |
| 10,922,282 | B2 | 2/2021 | Jalagam et al. |
| 11,244,284 | B2 | 2/2022 | Milvaney et al. |
| 11,669,793 | B2 | 6/2023 | Bakshi et al. |
| 11,941,378 | B1 | 3/2024 | Adler et al. |
| 2004/0049481 | A1 | 3/2004 | Blevins |
| 2004/0260593 | A1 | 12/2004 | Abraham-fuchs et al. |
| 2006/0074703 | A1 | 4/2006 | Bhandarkar et al. |
| 2007/0005388 | A1 | 1/2007 | Busch et al. |
| 2007/0157210 | A1 | 7/2007 | Inoue et al. |
| 2007/0203589 | A1 | 8/2007 | Flinn et al. |
| 2007/0265900 | A1 | 11/2007 | Moore et al. |
| 2008/0114791 | A1* | 5/2008 | Takatsu .................. G06Q 10/06 |
| 2008/0183536 | A1 | 7/2008 | Hirabayashi |
| 2009/0172101 | A1 | 7/2009 | Arthursson |
| 2009/0249290 | A1 | 10/2009 | Jenkins et al. |
| 2011/0004583 | A1 | 1/2011 | Honda |
| 2012/0239739 | A1 | 9/2012 | Manglik et al. |
| 2013/0275475 | A1 | 10/2013 | Ahlborn |
| 2014/0201642 | A1 | 7/2014 | Vicat-Blanc |
| 2014/0317031 | A1 | 10/2014 | Babenko et al. |
| 2015/0039745 | A1 | 2/2015 | Degioanni |
| 2015/0067028 | A1 | 3/2015 | Kumar et al. |
| 2015/0082271 | A1 | 3/2015 | Damonte et al. |
| 2015/0088924 | A1* | 3/2015 | Abadi ............... G06F 16/90335 707/769 |
| 2015/0149535 | A1 | 5/2015 | Howard |
| 2015/0370878 | A1 | 12/2015 | Caruana et al. |
| 2017/0048285 | A1 | 2/2017 | Pearl et al. |
| 2017/0068915 | A1 | 3/2017 | Nair |
| 2017/0139550 | A1 | 5/2017 | Milvaney et al. |
| 2017/0168765 | A1 | 6/2017 | Fan et al. |
| 2017/0264566 | A1 | 9/2017 | Namboodiri et al. |
| 2017/0264567 | A1 | 9/2017 | Shetty et al. |
| 2017/0316363 | A1 | 11/2017 | Siciliano et al. |
| 2018/0089591 | A1 | 3/2018 | Zeiler et al. |
| 2018/0095778 | A1 | 4/2018 | Aydelott et al. |
| 2018/0109574 | A1 | 4/2018 | Vigoda et al. |
| 2018/0113718 | A1 | 4/2018 | Bhamidipati et al. |
| 2019/0026663 | A1 | 1/2019 | Homeyer et al. |
| 2019/0102440 | A1 | 4/2019 | Tabak |
| 2019/0258498 | A1 | 8/2019 | Chandan et al. |
| 2019/0318420 | A1 | 10/2019 | Summerson et al. |
| 2019/0332695 | A1* | 10/2019 | Bensberg .............. G06F 16/211 |
| 2020/0012730 | A1 | 1/2020 | Schouten et al. |
| 2020/0050330 | A1 | 2/2020 | Schilling et al. |
| 2020/0065152 | A1 | 2/2020 | Parmar et al. |
| 2020/0301674 | A1 | 9/2020 | Swope et al. |
| 2020/0380432 | A1 | 12/2020 | Wang et al. |
| 2020/0389543 | A1 | 12/2020 | Swope et al. |
| 2021/0004273 | A1 | 1/2021 | You et al. |
| 2022/0083679 | A1 | 3/2022 | Hiller et al. |

OTHER PUBLICATIONS

Belhajjame et al. Metadata Management in the Taverna Workflow System. IEEE International Symposium on Cluster Computing and the Grid, 2008, pp. 651-656. (Year: 2008).*

Belhajjame et al. Metadata Management in the Taverna Workflow System. IEEE International Symposium on Cluster Computing and the Grid, pp. 651-656. (Year: 2008).*

Jensen et al. Using Characteristics of Computational Science Schemas for Workflow Metadata Management. IEEE Congress on Services 2008—Part I, pp. 445-452. (Year: 2008).*

What is Dublin Core (DC)? https://www.techtarget.com/whatis/definition/Dublin-Core, 2008, pp. 1-7. (Year: 2008).*

Jensen et al. teaches using schemas to manage computational science workflows, in Using Characteristics of Computational Science Schemas for Workflow Metadata Management. IEEE Congress on Services 2008—Part I. 2008, pp. 445-452. (Year: 2008).*

Non-Final Office Action dated Apr. 15, 2021 for related U.S. Appl. No. 16/726,093.

Glatard, T. et al., "Software architectures to integrate workflow engines in science gateways", Future Generation Computer Systems, vol. 75, (Oct. 2017).

Duranova, E. "Data Object Classes", DNAnexus, (last edited on Oct. 4, 2018).

"Informatica® Test Data Management 10.2.1", User Guide, (May 2018).

Zalcman, A. "Developer Tutorials/Workflow Build Process", DNAnexus, (last edited on Oct. 4, 2018).

Salesforce, "Metadata API Developer Guide", Version 46.0, Summer '19, (Last updated: May 22, 2019).

IBM Curam Social Program Management, Curam Workflow Reference Guide, Version 6.0.4.

Non-Final Office Action dated Nov. 8, 2021 for realated U.S. Appl. No. 16/553,161.

Vardigan, Mary, et al. "Creating Rich, Structured Metadata: Lessons Learned in the Metadata Portal Project." IASSIST Quarterly 38.3 (2015): 15-15.

Final Office Action dated Oct. 26, 2021 for related U.S. Appl. No. 16/726,093.

Final Office Action for U.S. Appl. No. 16/726,093 dated Oct. 26, 2021.

Non-Final Office Action for U.S. Appl. No. 16/726,093 dated Apr. 15, 2021.

Non-Final Office Action for U.S. Appl. No. 16/948,829 dated Sep. 15, 2021.

Geisriegler, "Actor Based Business Process Modeling and Execution: a Reference Implementation Based on Ontology Models and Microservices," 2017 43rd Euromicro Conference on Software Engineering and Advanced Applications (S EAA) , pp. 359-362 (Year: 2017).

Koschmider, "Recommendation-based editor for business process modeling," 2011, Data & Knowledge Engineering, vol. 70, pp. 483-503 (Year: 2011).

"SharePoint 2013 Workflow—Dynamic Values", AndrewConnell, dated Jul. 17, 2012, URL: https://www.andrewconnell.com/blog/SP2013-Workflow-Dynamic-Values/.

"Workflow Variable Datatype Conversion", Informatica, dated Apr. 15, 2019, URL: https://docs.informatica.com/data-integration/data-services/10-2/developer-workflow-guide/workflow-variables/workflow-variable-datatype-conversion.html.

"Creating Dynamic Variable Types", UIPath Forum, dated Aug. 2019, URL: https://forum.uipath.com/t/creating-dynamic-variable-types/141077.

"Developing Web Views for VMware vCenter Orchestrator", vRealize Orchestrator 5.5, vmware, copyright 2017.

"VMware vCenter Orchestrator 5.5 Release Notes", Vmware, dated Jun. 26, 2017.

"Developing with Vmware vCenter Orchestrator," vRealize Orchestrator 5.5.1, copyright 2014.

"Developing a Web Services Client for VMware vCenter Orchestrator," vRealize Orchestrator 5.5.1, copyright 2014.

"VMware vCenter Orchestrator 5.5.1 Release Notes", vmware, dated Jun. 23, 2017.

"Using the Vmware vCenter Orchestrator Client," vRealize Orchestrator 5.5.1, Copyright 2014.

"Installing and Configuring Vmware vCenter Orchestrator," vRealize Orchestrator 5.5.2, Copyright 2014.

(56) References Cited

OTHER PUBLICATIONS

"VMware vCenter Orchestrator 5.5.2 Release Notes," vmware, dated Jun. 16, 2017.
"Using VMware vCenter Orchestrator Plug-Ins," vRealize Orchestrator 5.5.2, Copyright 2014.
"VMware vCenter Orchestrator 5.5.3 Release Notes," vmware, dated Jun. 23, 2017.
"VMware vCenter Orchestrator 5.5.2.1 Release Notes," vmware, dated Jun. 16, 2017.
"ProcessMaker Advanced Workflow for DocuSign," DocuSign, date obtained via Google as 2018, URL: https://partners.docusign.com/s/partner-solution/aNR1W0000000011/processmaker-advanced-workflow-for-docusign-esignature.
"DocuSign Electronic Signature Workflow," ProcessMaker, date obtained via Google as Dec. 5, 2016, URL: https://www.processmaker.com/landing/processmaker-docusign/.
Glatard, T., et al. "Software architectures to integrate workflow engines in science gateways," Future Generation Computer Systems vol. 75, Oct. 2017, pp. 239-255.
"Data Object Classes," copyright 2013, DNAnexus, Inc.
"Metadata API Developer Guide," SalesForce, Version 46.0, dated 2019.
"Cúram Workflow Reference Guide," Version 6.0.4, Copyright 2011, Cúram Software Limited.
"Developer Tutorials/Workflow Build Process," copyright 2013, DNAnexus, Inc.
"IBM Case Manager target object store extensions," IBM Corporation, Copyright 2016.
Vardigan, M., et al., "Creating Rich, Structured Metadata: Lessons Learned in the Metadata Portal Project," IASSIST Quarterly, dated 2014.
"User Guide," Informatica® Test Data Management 10.2.1, dated May 2018.
"Do more with Dropbox using your favorite tools," Dropbox, date found via Internet Archive as Mar. 8, 2021, URL: https://www.dropbox.com/features/extensions.
"Build better campaigns with Dropbox for Salesforce Marketing Cloud," Dropbox Team, dated Jun. 17, 2019, URL: https://blog.dropbox.com/topics/product-tips/dropbox-marketing-cloud.
English Translation of CN-108256788-A, translated on Sep. 28, 2021 (original reference published on Jul. 6, 2018).
Non-Final Office Action for U.S. Appl. No. 16/726,081 dated Oct. 4, 2021.
Final Office Action for U.S. Appl. No. 16/948,829 dated Mar. 1, 2022.
Notice of Allowance for U.S. Appl. No. 16/726,093 dated Feb. 25, 2022.
Final Office Action for U.S. Appl. No. 16/553,161 dated Mar. 21, 2022.
Notice of Allowance for U.S. Appl. No. 16/726,093 dated Apr. 14, 2022.
Final Office Action for U.S. Appl. No. 16/726,081 dated Apr. 14, 2022.
Non-Final Office Action for U.S. Appl. No. 16/726,081 dated Aug. 5, 2022.
Notice of Allowance for U.S. Appl. No. 16/726,093 dated Aug. 31, 2022.
Non-Final Office Action for U.S. Appl. No. 16/553,161 dated Aug. 15, 2022.
Notice of Allowance dated Sep. 21, 2022 for U.S. Appl. No. 17/447,562.
Notice of Allowance dated Dec. 30, 2022 for U.S. Appl. No. 16/726,093.
Notice of Allowance for U.S. Appl. No. 16/726,081 dated Jan. 26, 2023.
Final Office Action for U.S. Appl. No. 16/553,161 dated Jan. 24, 2023.
Notice of Allowance dated May 11, 2023 for U.S. Appl. No. 16/553,161.
Notice of Allowance dated Feb. 15, 2023 for U.S. Appl. No. 16/726,093.
Non-Final Office Action dated Feb. 28, 2023 for U.S. Appl. No. 16/948,829.
Notice of Allowance dated Aug. 23, 2023 for related U.S. Appl. No. 17/447,562.
Final Office Action dated Jul. 13, 2023 for U.S. Appl. No. 16/948,829.
Non-Final Office Action dated Feb. 8, 2024 for related U.S. Appl. No. 16/948,829.
Non-Final Office Action dated Jul. 25, 2024 for related U.S. Appl. No. 18/400,560.
Notice of Allowance dated Jul. 17, 2024 for related U.S. Appl. No. 16/948,829.
Final Office Action dated Nov. 19, 2024 for related U.S. Appl. No. 18/400,560.
Non-Final Rejection dated Sep. 20, 2024 for related U.S. Appl. No. 18/309,982.
Notice of Allowance dated Apr. 4, 2025, for related U.S. Appl. No. 18/400,560.
Final Office Action dated Apr. 10, 2025, for related U.S. Appl. No. 18/309,982.
Non-Final Office Action dated Aug. 6, 2025, for related U.S. Appl. No. 18/309,982.
Non-Final Rejection dated Jan. 23, 2025, for related U.S. Appl. No. 18/470,390.
Final Office Action dated May 30, 2025 for related U.S. Appl. No. 18/470,390.
Notice of Allownace dated Oct. 23, 2025 for related U.S. Appl. No. 18/470,390.
Final Office Action dated Nov. 13, 2025, for related U.S. Appl. No. 18/309,982.
Notice of Allowance dated Jan. 28, 2026, for related U.S. Appl. No. 18/400,560.
Notice of Allowance dated Apr. 10, 2026, for related U.S. Appl. No. 18/309,982.

* cited by examiner

EXTENSIBLE CONTENT OBJECT METADATA

CROSS-REFERENCE TO RELATED APPLICATION(S)

The present application claims the benefit of priority to U.S. Patent Application Ser. No. 62/723,435 titled "COLLABORATION SYSTEMS", filed on Aug. 27, 2018, which is hereby incorporated by reference in its entirety.

FIELD

This disclosure relates to content management systems, and more particularly to techniques for creating and managing extensible content object metadata.

BACKGROUND

Cloud-based content management services and systems have impacted the way personal and corporate electronic information objects (e.g., files, images, videos, etc.) are stored, and has also impacted the way such personal and corporate content objects are shared and managed. Content management systems provide an ability to securely share large volumes of content objects among trusted collaborators on a variety of user devices, such as mobile phones, tablets, laptop computers, desktop computers, and/or other devices. In some systems, sharing and collaboration activities include one or more operations that are performed over the content objects. Such operations are often organized into workflows. Workflows specify certain operations that are to be performed in an ordered sequence or "flow" over the content objects.

The operations of a workflow may be performed by one user, multiple users (e.g., collaborators), and/or even autonomously by one or more computing entities (e.g., processes, agents, applications, etc.). As an example, a document approval workflow might facilitate the approval of a published document by automatically forwarding the document in a sequence to a set of approvers for user viewing, editing, and approval. As the number of users and content objects served by cloud-based content management systems continues to increase, so does the number of workflows and underlying operations that are performed over the content objects.

The execution efficiency of many operations performed over the content objects can be improved by accessing various attributes of the content objects. Such object attributes can describe the size, creation date, last modification date, and/or other characteristics of the content object. For example, a document backup operation might consider the last modification date of a content object to determine if that content object has been changed since the last backup event. In such a case, the efficiency of the backup operation is improved by not backing up a content object that has not changed since the last backup event. The aforementioned object attributes can be embedded in the content object (e.g., in a media file) and/or included in the file system metadata associated with the content object.

Modern cloud-based content management systems often implement a single global metadata schema that is applied over all content objects so as to capture properties and/or metadata associated with the content objects. Such a global metadata schema is often statically configured to, for example, hold file system metadata and/or a mix of file system metadata and other metadata that facilitates performance of various collaboration activities.

Unfortunately, such a static global metadata schema is deficient with respect to efficient execution of operations and/or workflows. To illustrate, consider a contract dashboard workflow that presents a list of active contracts sorted by contract value. This workflow can be efficiently performed if a contract value attribute such as a contract value attribute expressed in dollars were to be included in the metadata associated with contracts. Having the contract value attribute in the metadata would obviate the need of having to open each contract content object in order to extract (e.g., parse, analyze, etc.) respective contract values. However, it can happen that a contract value attribute (or some other attribute that pertains to a different example) might be a newly demanded metadata attribute that is specific only to a specific contract dashboard workflow. As such, it would most likely not be included in a global metadata schema.

One possible approach to adding and managing workflow-specific metadata or any such specialized metadata is to extend, as the need arises, the global metadata schema to include the workflow-specific metadata. As can be seen however, this approach would consume significant computing resources to continually update and maintain a global metadata schema to accommodate a growing number of workflows and/or other operations. This sort of continuous updating becomes extremely inefficient and/or impractical. Moreover, many content objects that are not subject to a particular workflow would need to nonetheless carry metadata associated with that specific workflow. What is needed is a way to efficiently associate workflow-specific metadata and/or operation-specific metadata and/or other specialized metadata with individual instances of content objects.

SUMMARY

The present disclosure describes techniques used in systems, methods, and in computer program products for creating and managing extensible content object metadata, which techniques advance the relevant technologies. More specifically, the present disclosure describes techniques used in systems, methods, and in computer program products for creating and maintaining extensible metadata for shared content objects. Certain embodiments are directed to technological solutions that apply structured sets of extensible metadata to content objects to facilitate the execution of operations (e.g., workflows) associated with the content objects.

The disclosed embodiments modify and improve over legacy approaches. In particular, the herein-disclosed techniques provide technical solutions that address the technical problems attendant to efficiently associating extensible metadata with content objects in highly collaborative content management systems. Such technical solutions involve specific implementations (i.e., data organization, data communication paths, module-to-module interrelationships, etc.) that relate to the software arts for improving computer functionality. In particular, various applications of the herein-disclosed improvements in computer functionality serve to reduce demands for computer memory, reduce demands for computer processing power, reduce network bandwidth usage, and reduce demands for intercomponent communications. For example, unnecessary management of metadata (e.g., unnecessary duplication, unnecessary propagation metadata, etc.) is avoided, which in turn results in less memory being used and fewer CPU cycles being demanded.

The ordered combination of steps of the embodiments serve in the context of practical applications that perform steps for applying structured sets of extensible metadata to shared content objects. Moreover, the herein-disclosed techniques for applying structured sets of extensible metadata to content objects serve to overcome long standing yet heretofore unsolved technological problems associated with efficiently associating extensible metadata with content objects in highly collaborative content management systems.

Aspects of the present disclosure achieve performance and other improvements in peripheral technical fields including (but not limited to) workflow management and design of human-machine interfaces.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
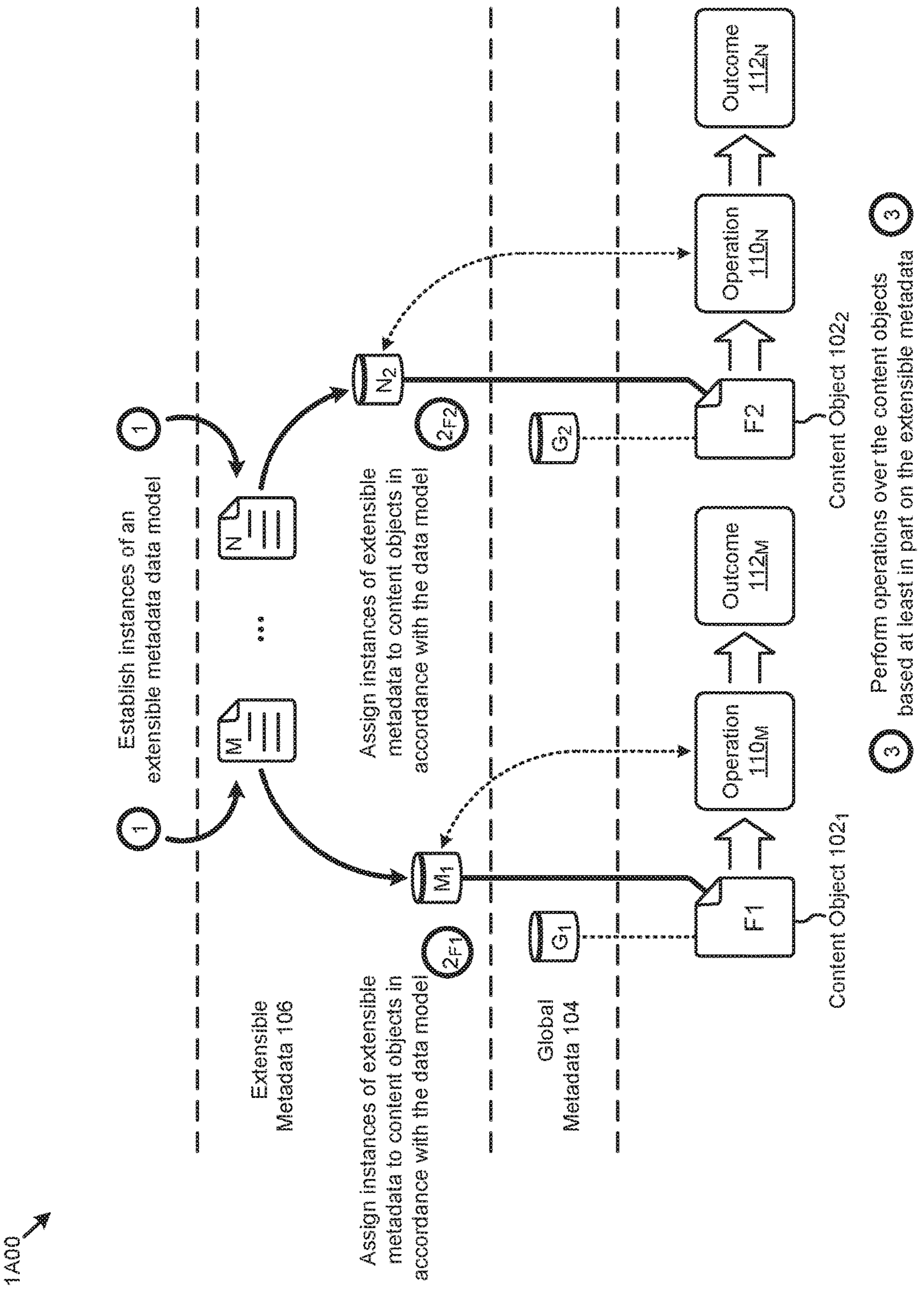
FIG. 1A exemplifies a computing environment in which embodiments of the present disclosure can be implemented.

Aspects of the present disclosure solve problems associated with using computer systems for efficiently associating extensible metadata with content objects in highly collaborative content management systems. These problems are unique to various computer-implemented methods that efficiently associate extensible metadata with content objects in highly collaborative content management systems. Some embodiments are directed to approaches for associating structured sets of extensible metadata to content objects so as to facilitate the execution of operations (e.g., workflows) over the content objects. The accompanying figures and discussions herein present example environments, systems, methods, and computer program products for extensible metadata for shared content objects.

Overview

Disclosed herein are techniques for applying structured sets of extensible metadata to content objects to facilitate the execution of operations (e.g., workflows) associated with the content objects. The sets of extensible metadata are structured in accordance with an extensible metadata data model. The extensible metadata data model is structured to accommodate a variety of extensible metadata that are specific to a particular operation or set of operations and specific to a particular content object. In certain embodiments, the operation-specific portion of the extensible metadata data model is associated with one or more metadata templates. A metadata template comprises information that characterizes the operation-specific portion of an extensible metadata data model. More specifically, A metadata template is a preconfigured set of attributes that pertain to a specific content object or a specific workflow or workflow stage.

Metadata templates might be created, for example, to establish extensible metadata that facilitate the execution of respective operations or sets of operations (e.g., workflows) over certain select content objects. A single content object can take on multiple associations with multiple metadata templates and that single object can serve in multiple contexts. For example, a content object used in a physical loss insurance claim context might be associated with a photograph, and that photograph might take on a first set of metadata that informs a first workflow, whereas in a different context, such as in a case of a ransomware or hacking or other sort of electronic data loss insurance claim the object might include a textural description that takes on a second set of metadata that informs a second workflow.

Certain metadata templates might be created for a set of respective workflows by one or more workflow administrators or architects that have detailed knowledge of the workflows and the content objects that are to be subjected to the workflows. As described herein, the extensible metadata attached to a content object (e.g., in accordance with a metadata template or an extensible metadata data model) is distinct from any workflow metadata that might be attached to the workflow (e.g., to manage workflow participants, workflow sequencing, etc.).

At some moment in time, some or all of the extensible metadata for a particular content object is initially assigned to the content object and populated in accordance with the extensible metadata data model and any underlying metadata templates. The timing of when the metadata assignment and/or the initial metadata population are performed can vary. In certain embodiments, an initial set of extensible metadata is assigned to a content object in response to a metadata template being attached to the content object by an administrator. Such attachment can be performed asynchronously to the execution of any operations (e.g., workflows) performed over the content object.

While certain default metadata values may be associated with a particular metadata template, other portions of the extensible metadata may be automatically populated at a later time (e.g., during execution of the underlying operations or workflows). The operations (e.g., workflows) are executed over the content objects based at least in part on the extensible metadata values, which may also be modified in accordance with the operations. In certain embodiments, the extensible metadata of a particular workflow are subjected to a set of workflow rules to determine one or more actions (e.g., workflow responses) associated with the workflow.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1A exemplifies a computing environment 1A00 in which embodiments of the present disclosure can be implemented. As an option, one or more variations of computing environment 1A00 or any aspect thereof may be implemented in the context of the architecture and functionality of the embodiments described herein. The computing environment 1A00 or any aspect thereof may be implemented in any environment.

FIG. 1A illustrates aspects pertaining to applying structured sets of extensible metadata to content objects to facilitate the execution of operations (e.g., workflows) associated with the content objects. Specifically, the figure presents a logical depiction of how the herein disclosed techniques can be used to assign sets of extensible metadata to select content objects to facilitate operations performed over the content objects. A representative set of high order operations are also presented to illustrate how the herein disclosed techniques might be applied in computing environment 1A00.

The logical depiction of FIG. 1A depicts two representative content objects (e.g., content object $\mathbf{102}_1$ and content object $\mathbf{102}_2$) that are associated with computing environment 1A00. Specifically, content object $\mathbf{102}_1$ is a file identified as "F1" and content object $\mathbf{102}_2$ is a file identified as "F2". File F1 and file F2 might be constituents of a corpus of many content objects (e.g., files, folders, data sets, etc.) maintained by a content management system for access by a plurality of users. As shown, instances of global metadata 104 are attached to the files. Specifically, global metadata $G_1$ is attached to file F1 and global metadata $G_2$ is attached to file F2.

Global metadata, as used herein, is metadata that is structured according to a single metadata schema (e.g., global metadata schema) that is applied to all content objects in a system. As such, the scope of the object attributes described by the instances of global metadata attached to the content objects is uniform over the entire corpus of content objects in the system. Global metadata might describe the size, creation date, last modification date, and/or other attributes of the content objects. In contrast to global metadata, extensible metadata is information that is applicable to particular content object or a particular type of content objects. As used herein extensible metadata is information that is particular to a given workflow and content object pair. The extensible metadata informs the workflow as to how to perform those operations on paired content object. Extensible metadata is different from global metadata at least in that a particular unit of extensible metadata can be associated with a content object in addition to that content object's global metadata.

In modern content management systems and, in particular, in highly collaborative systems having a large number of content objects, the number and variety of operations and/or combinations of operations performed over content objects is exploding. New workflows are being defined each day, which workflows are performed over one or more content objects so as to achieve certain outcomes. Such operations might be associated with editing, viewing, sorting, filtering, querying, copying, deleting, and/or other activities performed over the content objects. The operations may be performed autonomously by a computing entity (e.g., process, agent, application, etc.) or in conjunction with certain user interactions (e.g., user inputs at a user interface).

Workflows can be used in many practical applications. For example, a computing entity performing a document backup operation might access the last modification date recorded in the global metadata of a content object to determine if the content object has been changed since the last backup event. In this case, computing resources are saved by not backing up a content object that has not changed since the last backup event.

As earlier mentioned, however, while some operations may be efficiently executed over a content object using the global metadata associated with the content object, many other operations might be most efficiently executed by using object attributes that are not included in the global metadata. However, extending the global metadata schema to include a full range of operation-specific metadata would consume significant computing resources that would be needed to continually update and maintain the ever-expanding schema over the corpus of content objects in a system.

The herein disclosed techniques associate operation-specific metadata with content objects. Structured sets of extensible metadata are associated with specific content objects. The information in the extensible metadata facilitates execution of operations of respective workflows.

Consider an operation $\mathbf{110}_M$ that is to be executed over file F1 to achieve an outcome $\mathbf{112}_M$, and an operation $\mathbf{110}_N$ that is to be executed over file F2 to achieve an outcome $\mathbf{112}_N$. In this case, respective instances of an extensible metadata data model associated with operation $\mathbf{110}_M$ and operation $\mathbf{110}_N$ are established (operation 1). An extensible metadata data model defines the content and structure of a set of extensible metadata. More specifically, the extensible metadata data model identifies the object attributes and/or other information to be included in the extensible metadata and the structure of how such object attributes and/or other information are codified in the extensible metadata. For example, a particular implementation of an extensible metadata data model might identify a "vendor" object attribute, a "status" object attribute, and a "value" object attribute that are to be organized with their respective values in a key-value structure (e.g., <attribute>:<value>) in a set of extensible metadata. The extensible metadata data model is structured to accommodate a variety of extensible metadata that are specific to a particular operation or set of operations and specific to a particular content object. As indicated in the figure, a first instance "M" of the extensible metadata data model is configured to facilitate the operation $\mathbf{110}_M$, and a second instance "N" of the extensible metadata data model is configured to facilitate the operation $\mathbf{110}_N$.

At some moment in time, instances of extensible metadata 106 are assigned to select content objects in accordance with the respective instances of the extensible metadata data model (operation 2). Specifically, a set $M_1$ of extensible metadata is assigned to file F1 in accordance with data model instance "M", and a set $N_2$ of extensible metadata is assigned to file F2 in accordance with data model instance "N". The operations (e.g., operation $\mathbf{110}_M$ and operation $\mathbf{110}_N$) are performed over the content objects (e.g., file F1 and file F2) in accordance with the respective sets (e.g., $M_1$ and $N_2$) of extensible metadata assigned to the content objects (operation 3). As merely one example, the inclusion or exclusion of file F1 in a list of files at a user interface might be determined by the outcome of a filter operation performed over a certain object attribute in the extensible metadata assigned to file F1. As another example, file F2 might be positioned in a list of files according to the outcome of a sorting operation performed over one or more object attributes included in the respective sets of extensible metadata assigned to file F2 and the other files in the list.

The assignment of operation-specific and object-specific sets of extensible metadata to content objects as disclosed herein facilitates improvements in computer functionality that serve to reduce the demand for computer memory, reduce the demand for computer processing power, reduce network bandwidth use, and reduce the demand for inter-component communication. Specifically, consumption of such computing resources to continually update and maintain a global metadata schema and corresponding instances of global metadata over the corpus of content objects in a system to accommodate a growing number and variety of operations performed over the content objects is eliminated.

The foregoing discusses techniques for assigning operation-specific sets of extensible metadata to facilitate the execution of operations over the content objects. As earlier mentioned, such operations are often organized into workflows. Workflows are combinations of operations that are to be performed in an ordered sequence or "flow" over one or more content objects. The operations of a workflow may be performed by one user, multiple users (e.g., collaborators), and/or even autonomously by one or more computing entities (e.g., processes, agents, applications, etc.). One embodiment of the herein disclosed techniques as applied to workflows in a content management environment is disclosed as follows.

Figure 1B:
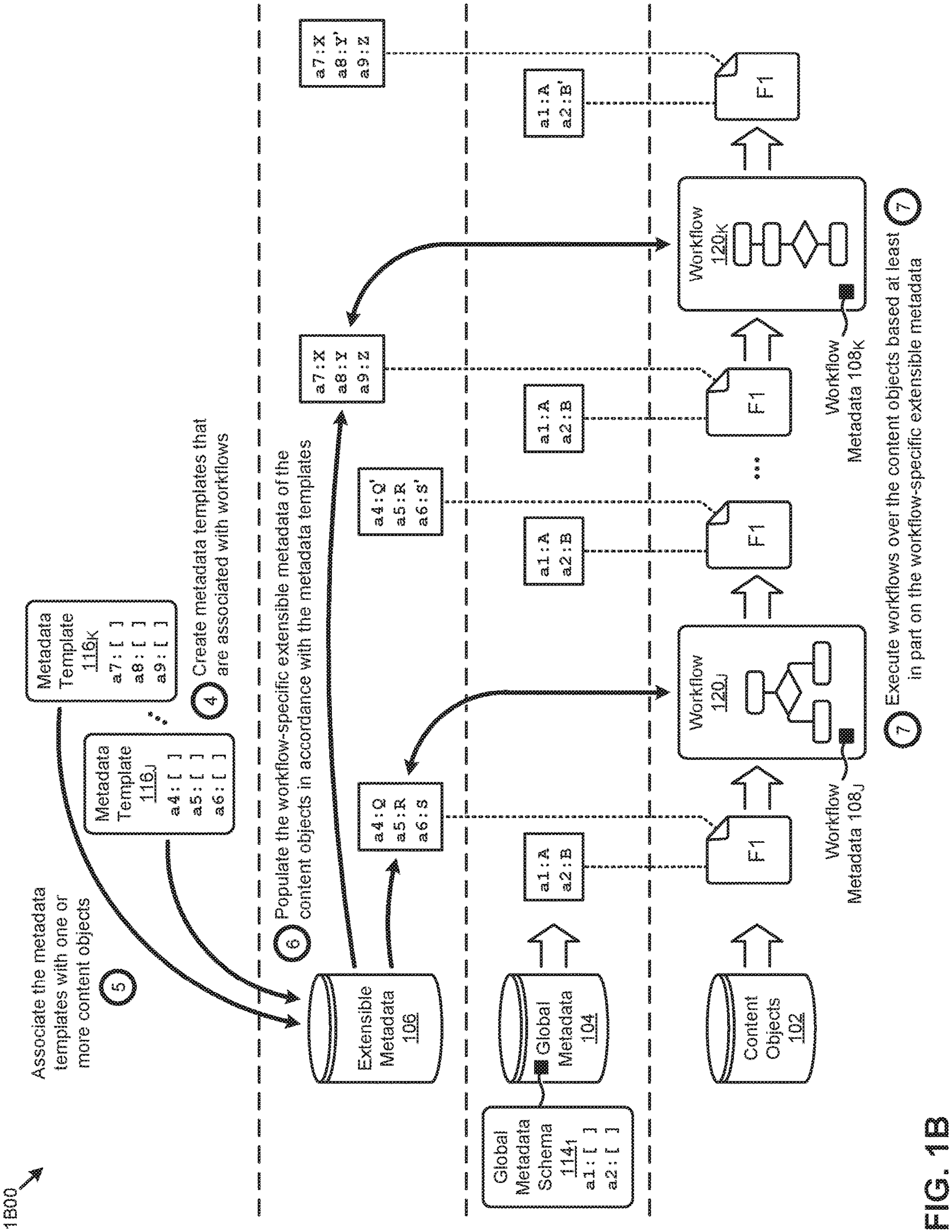
FIG. 1B illustrates a content management environment in which embodiments of the present disclosure can be implemented.

FIG. 1B illustrates a content management environment 1B00 in which embodiments of the present disclosure can be implemented. As an option, one or more variations of content management environment 1B00 or any aspect thereof may be implemented in the context of the architecture and functionality of the embodiments described herein. The content management environment 1B00 or any aspect thereof may be implemented in any environment.

FIG. 1B illustrates aspects pertaining to applying structured sets of extensible metadata to content objects to facilitate the execution of operations (e.g., workflows) associated with the content objects. Specifically, the figure presents a logical depiction of how the herein disclosed techniques can be used to assign two or more sets of extensible metadata to a content object to facilitate workflows performed over the content object. A representative set of high order operations are also presented to illustrate how the herein disclosed techniques might be applied in content management environment 1B00.

The logical depiction of FIG. 1B depicts a representative content object (e.g., file F1) from a set of content objects 102 maintained by a content management system in content management environment 1B00. As shown, instances of global metadata 104 are attached to file F1. The global metadata of file F1 is structured according to a global metadata schema $\mathbf{114}_1$. Global metadata schema $\mathbf{114}_1$ indicates that values for two object attributes identified as "a1" and "a2" are included in the global metadata attached to file F1. FIG. 1B also depicts two representative workflows, workflow $\mathbf{120}_J$ and workflow $\mathbf{120}_K$, that are to be executed over file F1. As discussed herein, however, the global metadata attached to file F1 may not facilitate efficient (e.g., as measured by computing resource consumption) execution of workflow $\mathbf{120}_J$ and workflow $\mathbf{120}_K$.

The herein disclosed techniques address such problems attendant to efficiently associating workflow-specific metadata with content objects in highly collaborative content management systems by applying structured sets of extensible metadata to content objects to facilitate the execution of respective workflows performed over the content objects. As earlier described, the sets of extensible metadata are structured in accordance with respective instances of an extensible metadata data model. In the embodiment of FIG. 1B, the instances of the extensible metadata data model are established at least in part by creating metadata templates that correspond to the workflows that are to be executed over certain content objects (operation 4). Such metadata templates, as used herein, comprise information that characterizes the operation-specific portion of instances of an extensible metadata data model, which instances describe the content and structure of respective sets of extensible metadata that are assigned to various content objects.

The metadata templates and associated instances of the extensible metadata data model are created according to the herein disclosed techniques to facilitate the execution of respective workflows over the content objects. For example, a metadata template 116$_J$ is created for content objects that are subjected to workflow 120$_J$, and metadata template 116$_K$ is created for content objects that are subjected to workflow 120$_K$. As can be observed, the object attributes (e.g., "a4", "a5", and "a6") identified by metadata template 116$_J$, the object attributes (e.g., "a7", "a8", and "a9") identified by metadata template 116$_K$, and the object attributes (e.g., "a1" and "a2") identified by global metadata schema 114$_1$ are all distinct from one another.

Shared object attributes over the various templates, data model instances, and schemas are possible. In some cases, the metadata templates might be created for a set of respective workflows by one or more workflow administrators or architects that have a detailed knowledge of the workflows and the content objects that are to be associated with the workflows. In any case, the extensible metadata attached to a content object (e.g., in accordance with a metadata template and/or extensible metadata data model) that is subject to a workflow is distinct from any workflow metadata (e.g., workflow metadata 108$_J$ and workflow metadata 108$_K$) that might be attached to the workflow itself (e.g., to manage workflow participants, workflow sequencing, etc.).

When the metadata templates are established, they are associated with one or more select content objects (operation 5). In the example scenario of FIG. 1B, metadata template 116$_J$ and metadata template 116$_K$ are both attached to file F1, as file F1 is to be subjected to workflow 120$_J$ and workflow 120$_K$. The workflow-specific extensible metadata for each content object associated with the metadata templates is populated in accordance with the templates (operation 6). As shown, the foregoing associations and sets of workflow-specific extensible metadata are codified in a set of extensible metadata 106 in content management environment 1B00. Specifically, a first set of extensible metadata (e.g., "a4:Q", "a5:R", and "a6:S") is populated according to metadata template **116*j* and assigned to file F1, and a second set of extensible metadata (e.g., "a7:X", "a8:Y", and "a9:Z") is populated according to metadata template 116**$_K$ and also assigned to file F1.

The timing of when the metadata template association and/or the initial extensible metadata population are performed can vary. In certain embodiments, an initial set of extensible metadata is assigned to a content object in response to a metadata template being attached to the content object by an administrator. Such attachment can be performed asynchronously to the execution of any workflows or operations performed over the content object. While certain default metadata values may be associated with a particular metadata template, other portions of the extensible metadata may be automatically populated at a later time (e.g., during execution of the underlying operations or workflows).

The workflows are executed over the content objects based at least in part on the workflow-specific extensible metadata (operation 7). More specifically, workflow 120$_J$ accesses the extensible metadata of file F1 that is structured according to metadata template **116*j* to facilitate the execution of workflow 120$_J$, and workflow 120$_K$ accesses the extensible metadata of file F1 that is structured according to metadata template 116$_K$ to facilitate the execution of workflow 120$_K$. In some cases, the extensible metadata may be modified in accordance with responses generated by a particular workflow. For example, object attributes "a4" and "a5" are modified in response to executing the workflow 120$_J$ and object attribute "a8" is modified in response to executing the workflow 120$_K$. Portions of global metadata 104 (e.g., object attribute "a2") may also be modified in accordance with one or more workflows (e.g., workflow 120**$_K$). For instance, object attribute "a2" may be modified from value "B" to value "B'", as shown.

One embodiment of techniques for managing extensible content objects is disclosed in further detail as follows.

Figure 2:
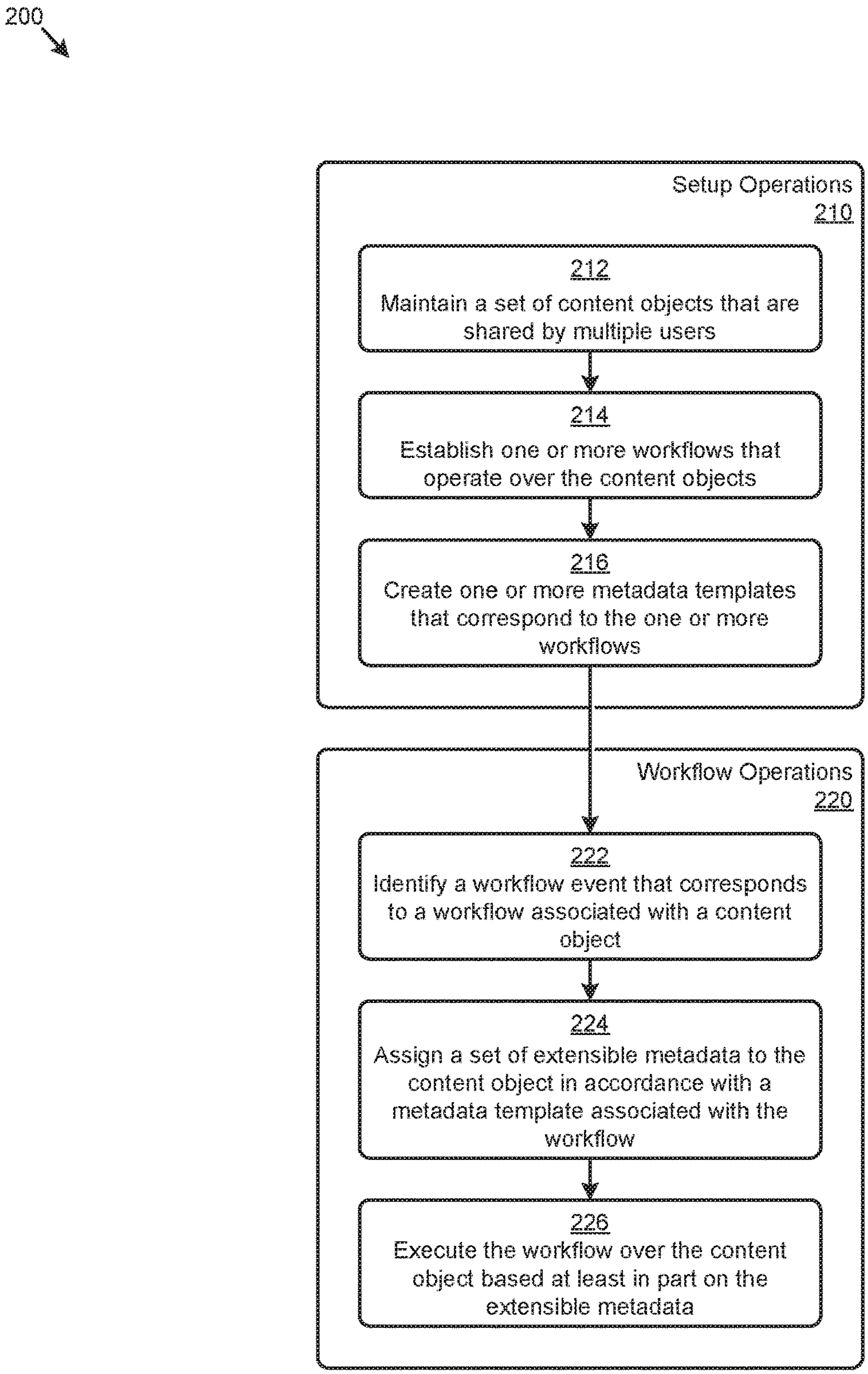
FIG. 2 exemplifies an extensible content object metadata management technique as implemented in systems that facilitate associating extensible metadata with content objects, according to an embodiment.

FIG. 2 exemplifies an extensible content object metadata management technique 200 as implemented in systems that facilitate associating extensible metadata with content objects. As an option, one or more variations of extensible content object metadata management technique 200 or any aspect thereof may be implemented in the context of the architecture and functionality of the embodiments described herein. The extensible content object metadata management technique 200 or any aspect thereof may be implemented in any environment.

FIG. 2 illustrates aspects pertaining to applying structured sets of extensible metadata to content objects to facilitate the execution of operations (e.g., workflows) associated with the content objects. Specifically, the figure is presented to illustrate one embodiment of certain steps and/or operations performed over a network of devices (e.g., user devices, computing systems, etc.) to assign the extensible metadata to the content objects in accordance with respective instances of an extensible metadata data model and/or metadata templates that are associated with the operations (e.g., workflows). As can be observed, the steps and/or operations can be grouped into a set of setup operations 210 and a set of workflow operations 220.

The setup operations 210 of extensible content object metadata management technique 200 commences by maintaining a set of content objects that are shared or otherwise accessed by multiple users (step 212). As an example, the content objects might be maintained by a content management system that facilitates access to and interactions over the content object by a plurality of users. In such systems, one or more workflows might be established to operate over the content objects (step 214). The workflows comprise one or more operations that are executed over certain ones of the content objects. The workflows and/or operations may involve interactions by the users and/or may be performed autonomously by one or more computing entities. To facilitate the herein disclosed techniques, one or more metadata templates that correspond to the one or more workflows are created (step 216). In some cases, a metadata template identifies a specific set of object attributes that will improve the execution performance of a respective workflow and/or its underlying operations.

As indicated in workflow operations 220 of extensible content object metadata management technique 200, a workflow event that corresponds to a workflow associated with a particular content object is detected (step 222). The workflow event can be one of many workflow events that correspond to the execution of the aforementioned workflows over the content objects. In this case, a workflow event corresponding to a particular one of the workflows being executed or to be executed over a particular one of the content objects is considered. The workflow event might be invoked upon creation of the workflow, and/or upon launch of the workflow over the content object, and/or upon creation and/or modification of the content object, and/or upon occurrence of some other event.

In response to identifying the workflow event, a set of extensible metadata is assigned to the content object in accordance with the metadata template associated with the workflow (step 224). In some cases, the assignment is achieved by associating the content object with the set of extensible metadata in a data record in a database (e.g., a row in a data table) according to an extensible metadata data model. Some or all of the extensible metadata may be populated in response to the assignment or prior to the assignment (e.g., as default metadata template values). The extensible metadata may be populated by one or more user inputs (e.g., by a user at a user interface) and/or automatically by one or more computing entities. As an example, an extensible metadata manager might access one or more learning models to determine certain portions of the extensible metadata.

When the extensible metadata associated with the content object is assigned and populated, the workflow is executed over the content object based at least in part on the extensible metadata (step 226). More specifically, the workflow accesses the extensible metadata of the content object that is defined by the metadata template to facilitate the execution of the workflow.

One embodiment of a system, data flows, and data structures for implementing the extensible content object metadata management technique 200 and/or other herein disclosed techniques, is disclosed as follows.

Figure 3:
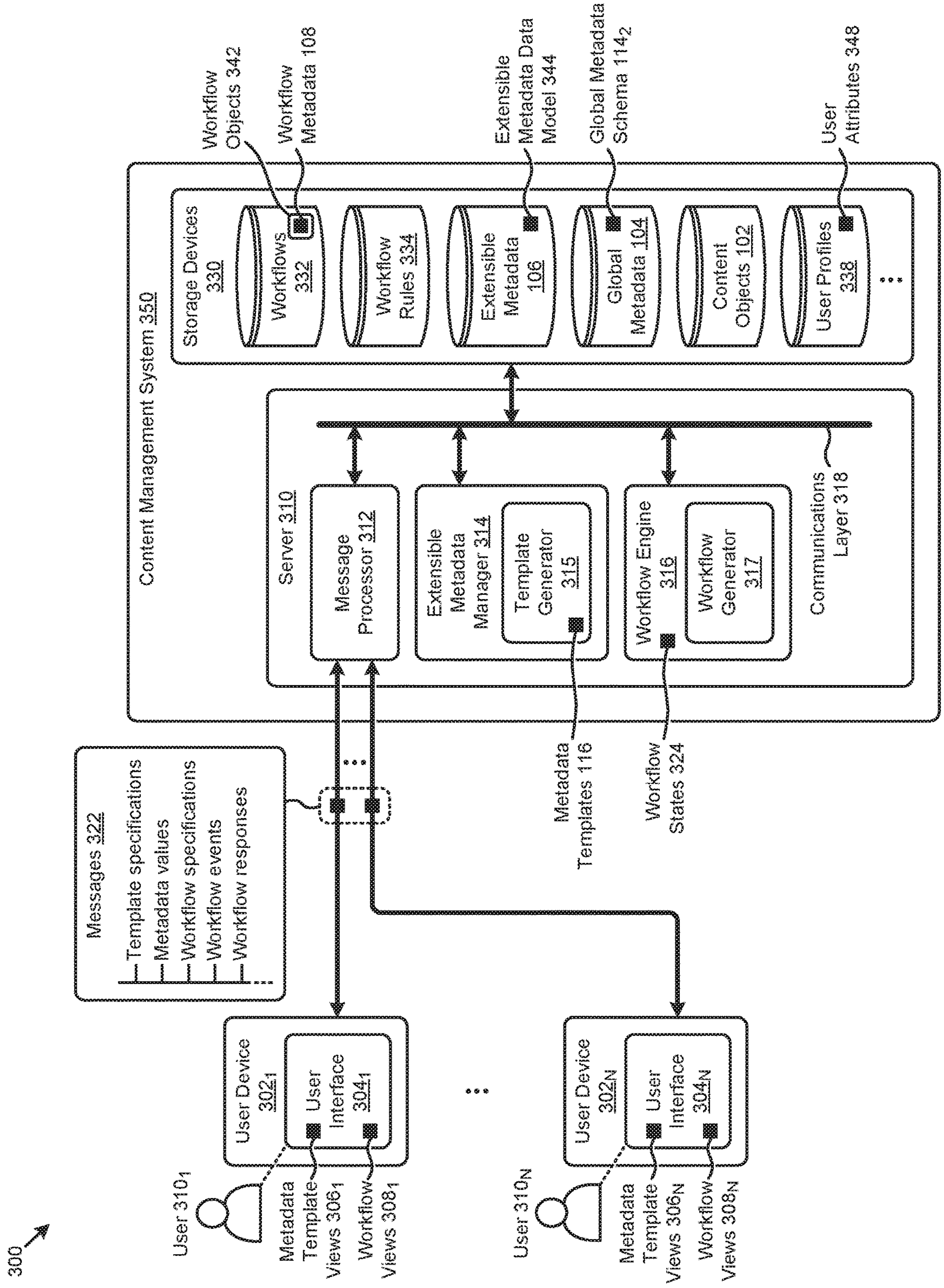
FIG. 3 presents a block diagram of a system that supports extensible metadata for shared content objects, according to an embodiment.

FIG. 3 presents a block diagram of a system 300 that supports extensible metadata for shared content objects. As an option, one or more variations of system 300 or any aspect thereof may be implemented in the context of the architecture and functionality of the embodiments described herein. The system 300 or any aspect thereof may be implemented in any environment.

FIG. 3 illustrates aspects pertaining to applying structured sets of extensible metadata to content objects to facilitate the execution of operations (e.g., workflows) associated with the content objects. Specifically, the figure is being presented to show one embodiment of certain representative components and associated data structure and data flows implemented in a computing environment to facilitate the herein disclosed techniques. As shown, the components, data flows, and data structures are associated with a set of users (e.g., user 310$_1$, . . . , user 310$_N$) that interact with each other and a set of content objects 102 managed at a content management system 350. The components, data flows, and data structures shown in FIG. 3 present one partitioning and associated data manipulation approach. The specific example shown is purely exemplary, and other subsystems, data structures, and/or partitioning are reasonable.

As shown, system 300 comprises an instance of a server 310 operating at content management system 350. Server 310 comprises a message processor 312, an extensible metadata manager 314 (which further comprises a template generator 315), and a workflow engine 316 (which further comprises a workflow generator 317). A plurality of instances of the foregoing components might operate at a plurality of instances of servers (e.g., server 310) at content management system 350 and/or any portion of system 300.

Such instances can access each other (e.g., through a communications layer 318) and/or a set of storage devices 330 that store various information that facilitates the operation of the components of system 300 and/or any implementations of the herein disclosed techniques. For example, server 310 might facilitate access to shared content in content objects 102 by the users (e.g., user 310$_1$, . . . , user 310$_N$) from a respective set of user devices (e.g., user device 302$_1$, . . . , user device 302$_N$). The content objects (e.g., files, folders, etc.) in content objects 102 are characterized at least in part by a set of global metadata 104 stored at storage devices 330. As earlier described, global metadata 104 might be structured in accordance with a global metadata schema 1142. Furthermore, the users are characterized at least in part by a set of user attributes 348 stored in a set of user profiles 338 at storage devices 330.

As discussed herein, the users who access the content objects maintained at content management system 350 perform various operations over the content objects to carry out certain activities (e.g., collaboration activities). Such operations are often combined and sequenced into workflows. To establish a workflow, a user issues a set of workflow specifications in one or more instances of messages 322 to be received by message processor 312. Specifically, such workflows might be specified by users (e.g., user 310$_1$, . . . , user 310$_N$) interacting with various instances of workflow views (e.g., workflow views 308$_1$, . . . , workflow views 308$_N$) presented at user interfaces (e.g., user interface 304$_1$, . . . , user interface 304$_N$) accessible by the users (e.g., at user device 302$_1$, . . . , user device 302$_N$).

The workflow specifications received at message processor 312 are forwarded to workflow generator 317 to generate an instance of a set of workflows 332 stored in storage devices 330. Workflows 332 are characterized by respective sets of workflow objects 342 that are generated by workflow generator 317 based at least in part on the submitted workflow specifications. Workflow generation might be performed exclusively by a user, or in a computer-aided fashion. In some cases, workflow objects 342 are generated autonomously from workflow specifications 417.

The workflow objects 342 describe, for example, the one or more operations that comprise the workflow, the relationships (e.g., parent-child relationships) between the operations, and the workflow states that correspond to the operations. As shown, workflow objects 342 can comprise instances of workflow metadata 108 that is accessed to facilitate the management of workflow participants, workflow sequencing, and/or other characteristics of workflows 332.

After a workflow is established, workflow engine 316 executes the workflow at least in part by receiving instances of workflow events and issuing instances of workflow responses according to a set of workflow states 324 associated with the workflow. In some cases, the workflow events and/or workflow responses are transmitted as instances of messages 322 between server 310 and the user devices of the users. Specifically, user 310$_1$ and user 310$_N$ might interact with respective instances of workflow views 308$_1$ and workflow views 308$_N$ to invoke workflow events and receive workflow responses associated with a particular workflow. For example, a user might click an "Approve" button in a workflow view to create a workflow event that might change the workflow state of the workflow.

In some cases, the workflow views can be derived from the workflow responses. For example, a workflow state change might precipitate a workflow response that results in presenting a signature box to a user (e.g., an approver) in a workflow view. The workflow responses may also invoke changes to workflow metadata 108. For example, a workflow event corresponding to a "Forward" button click might generate a workflow response comprising an update to workflow metadata 108 that describes a workflow state change (e.g., from "active" to "done") which then triggers a workflow alert to be sent to the user device of the owner of the next operation(s) in the workflow.

In accordance with the herein disclosed techniques, the execution of workflows 332 is facilitated at least in part by extensible metadata 106 stored in storage devices 330 of content management system 350. Specifically, sets of extensible metadata 106 are attached to select instances of content objects 102 to facilitate execution of workflows 332 over the content objects. The sets of extensible metadata 106 are structured according to respective instances of an extensible metadata data model 344. Each instance of extensible metadata data model 344 is configured to facilitate the execution of one or more operations or sets of operations (e.g., workflows).

The operation-specific portion of extensible metadata data model 344 is often derived from instances of metadata templates 116. In the shown embodiment, a metadata template is defined by a set of template specifications issued to content management system 350 in one or more instances of messages 322. Such template specifications might identify the object attributes, the value options and/or types for the object attributes, and/or the default values to be included in instances of extensible metadata that are associated with the metadata template.

In certain embodiments, template generator 315 at extensible metadata manager 314 presents various instances of metadata template views (e.g., metadata template views $\mathbf{306}_1$, . . . , metadata template views $\mathbf{306}_N$) at the user devices of the users to facilitate selection and recording of the template specifications. The users interact with the metadata template views (e.g., a sequence of views that comprise a metadata template generation wizard) to submit the template specifications to template generator 315, which uses the specifications to generate respective instances of metadata templates 116. Metadata templates 116 and extensible metadata data model 344 are consulted by extensible metadata manager 314 to populate and assign sets of extensible metadata 106 to select instances of content objects 102. In some cases, instances of messages 322 comprising various metadata values are issued by the users (e.g., from user inputs entered at their respective user interfaces) and received at extensible metadata manager 314 to facilitate the population of the extensible metadata 106. In other cases, extensible metadata manager 314 accesses various computing entities at content management system 350 to populate the extensible metadata 106.

Workflow engine 316 accesses the sets of extensible metadata 106 associated with certain content objects to facilitate the workflows executed over those content objects. In some embodiments, workflow engine 316 applies the extensible metadata to a set of workflow rules 334 to determine the workflow responses of the workflows. In some cases, certain workflow events and/or workflow metadata may also be applied to workflow rules 334 to determine the workflow responses. As shown, such workflow rules are stored in a set of workflow rules 334 in storage devices 330 of content management system 350. A set of rules (e.g., rule base) such as workflow rules 334, or any other rules described herein, comprise data records storing various information that can be used to form one or more constraints to apply to certain functions and/or operations. For example, the information pertaining to a rule in the rule base might comprise the conditional logic operands (e.g., input variables, conditions, constraints, etc.) and/or operators (e.g., "if", "then", "and", "or", "greater than", "less than", etc.) for forming a conditional logic statement that returns one or more results.

In some cases, the information pertaining to a rule might comprise the conditions (e.g., predicates, conditional expressions, field names, field values, etc.) and commands and clauses (e.g., "select", "where", "order by", etc.) for forming a data statement (e.g., a query) that returns one or more results. Workflow rules 334, for example, might consume certain object attributes from the sets of extensible metadata 106 as inputs to determine one or more workflow responses as outputs.

The foregoing discussions include techniques for creating metadata templates that correspond to one or more workflows (e.g., step 216 of FIG. 2) for incorporation into instances of an extensible metadata data model, which techniques are disclosed in further detail as follows.

Figure 4A:
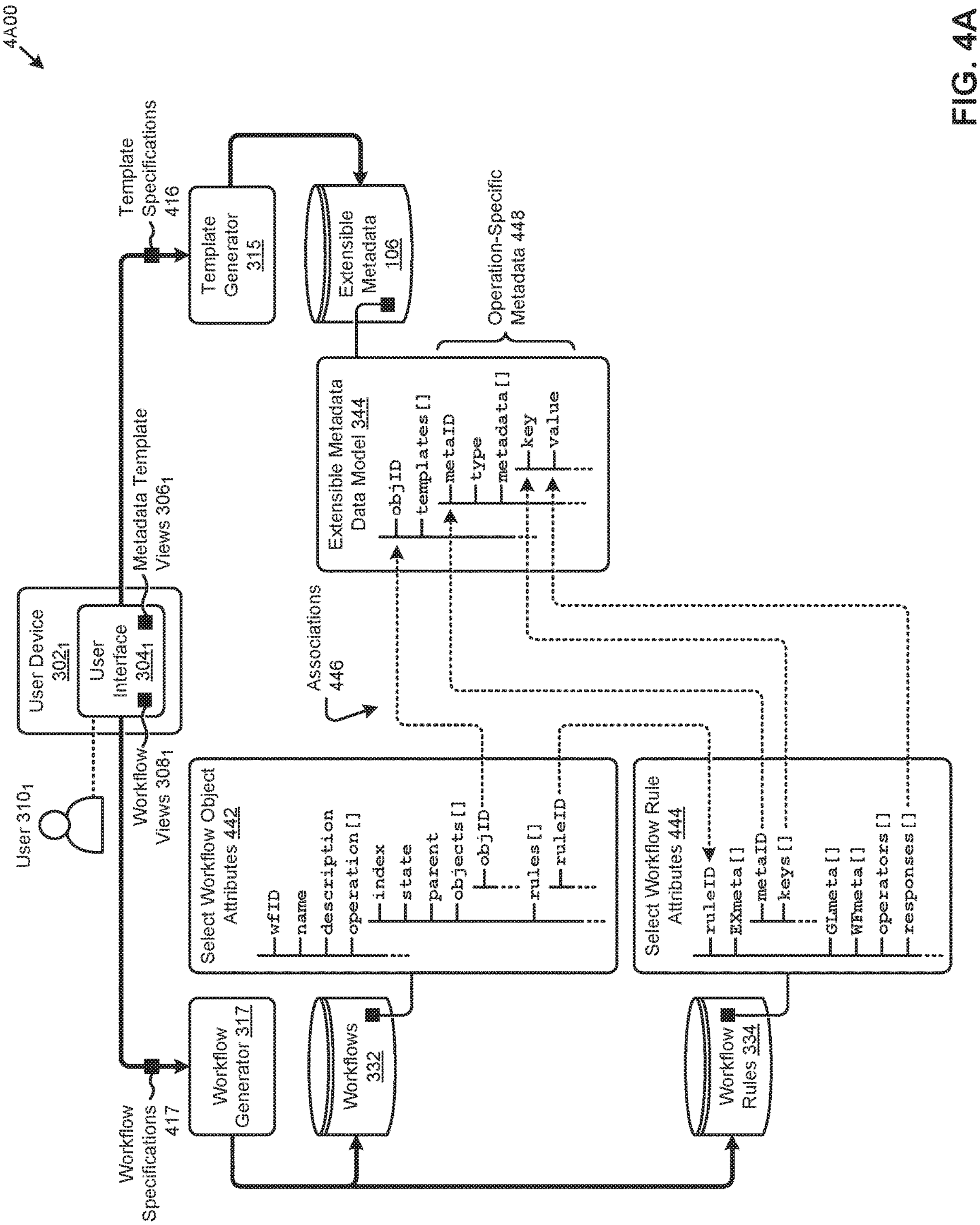
FIG. 4A depicts a metadata template creation technique as implemented in systems that facilitate associating extensible metadata with content objects, according to an embodiment.

FIG. 4A depicts a metadata template creation technique 4A00 as implemented in systems that facilitate associating extensible metadata with content objects. As an option, one or more variations of metadata template creation technique 4A00 or any aspect thereof may be implemented in the context of the architecture and functionality of the embodiments described herein. The metadata template creation technique 4A00 or any aspect thereof may be implemented in any environment.

FIG. 4A illustrates aspects pertaining to applying structured sets of extensible metadata to content objects to facilitate the execution of operations (e.g., workflows) associated with the content objects. Specifically, the figure is being presented to illustrate one embodiment of certain specialized data structures associated with the metadata templates that are created to facilitate the assignment of extensible metadata to content objects. More specifically, the figure depicts how the data structures codify certain associations between metadata templates, extensible metadata, content objects, workflows, workflow rules, and/or other entities to facilitate the herein disclosed techniques. The representative data structures depicted in FIG. 4A are described by a set of select workflow object attributes 442 associated with workflows 332, a set of select workflow rule attributes 444 associated with workflow rules 334, and the extensible metadata data model 344 associated with extensible metadata 106. A representative set of associations 446 (e.g., relationships, mappings) between the data structures are also shown.

The representative data structures of FIG. 4A and other specialized data structures described herein are designed to improve the way a computer stores and retrieves data in memory when performing the herein disclosed techniques. Such specialized data structures can be implemented in a computing and/or storage system using various techniques. For example, the various representative data structures depicted in metadata template creation technique 4A00 indicate that the data associated with the structures might be organized and/or stored in a tabular structure (e.g., relational database table, HBase table, etc.) that has rows that relate various attributes with a particular data entity. As another example, the underlying data might be organized and/or stored in a programming code object that has instances corresponding to a particular data entity and properties corresponding to the various attributes associated with the data entity.

According to metadata template creation technique 4A00, user $\mathbf{310}_1$ interacts with various instances of metadata template views $\mathbf{306}_1$ at user interface $\mathbf{304}_1$ of user device $\mathbf{302}_1$ to create metadata templates. Specifically, user $\mathbf{310}_1$ issues instances of template specifications 416 to template generator 315 to create respective instances of metadata templates 116. When a set of extensible metadata 106 is assigned to a content object and populated according to the herein disclosed techniques, one or more of the metadata templates 116 are applied to an extensible metadata data model to determine the structure and/or organization of the set of extensible metadata. More specifically, the one or more metadata templates 116 define the content and structure of the operation-specific portion of the set of extensible metadata, as earlier discussed.

As shown in the representative depiction of extensible metadata data model 344 in FIG. 4A, one or more sets of operation-specific metadata 448 that respectively correspond to instances of metadata templates 116 are included in the sets of extensible metadata that are populated in accordance with extensible metadata data model 344. Specifically, the sets of operation-specific metadata 448 (e.g., stored in a "templates [ ]" object) each describe a metadata template identifier (e.g., stored in a "metaID" field), a template type (e.g., stored in a "type" field), and one more instances of metadata (e.g., stored in a "metadata [ ]" object). As shown, the metadata associated with the metadata template can be organized as key-value pairs, with each key (e.g., stored in a "key" field) representing a particular object attribute, and each value (e.g., stored in a "value" field) representing the then-current value of that object attribute. The representative depiction of extensible metadata data model 344 further indicates that each set of extensible metadata 106 includes a content object identifier (e.g., stored in an "objID" field), which identifier serves to associate a particular set of extensible metadata with a particular content object. Other metadata not represented in the depiction of extensible metadata data model 344 in FIG. 4A are possible.

One application of the extensible metadata as disclosed herein assigns sets of extensible metadata to content objects to facilitate the execution of workflows or other specialized services over the content objects. To establish such workflows, user $\mathbf{310}_1$ interacts with various instances of workflow views $\mathbf{308}_1$ at user interface $\mathbf{304}_1$ of user device $\mathbf{302}_1$. Specifically, user $\mathbf{310}_1$ interacts with workflow views $\mathbf{308}_1$ to issue instances of workflow specifications 417 to workflow generator 317 to generate respective instances of workflows 332 and associated instances of workflow rules 334.

As depicted in select workflow object attributes 442, each instance of workflows 332 is represented by an object that describes a workflow identifier (e.g., stored in a "wfID" field), a workflow name (e.g., stored in a "name" field), a workflow description (e.g., stored in a "description" field), a set of operations associated with the workflow (e.g., stored in an "operations [ ]" object), and/or other attributes. As can be observed, each operation of the workflow is described by an operation sequence index (e.g., stored in an "index" field), an operation state description (e.g., stored in a "state" field), a parent operation associated with the operation (e.g., stored in a "parent" field), one or more identifiers that correspond to the one or more content objects associated with a particular instance of the operation (e.g., each identifier stored in an "objID" field in an "object [ ]" object), one or more identifiers that correspond to one or more workflow rules associated with the operation (e.g., each identifier stored in a "ruleID" field in a "rules [ ]" object), and/or other attributes.

As indicated in select workflow rule attributes 444, each instance of workflow rules 334 is described by a rule identifier (e.g., stored in a "ruleID" field), information for accessing a set of extensible metadata to apply to the rule (e.g., stored in an "EXmeta [ ]" object), information for accessing a set of global metadata to apply to the rule (e.g., stored in a "GLmeta [ ]" object), information for accessing a set of workflow metadata to apply to the rule (e.g., stored in a "WFmeta [ ]" object), various operators associated with the rule (e.g., stored in an "operators [ ]" object), data pertaining to workflow responses generated by the rule (e.g., stored in a "responses [ ]" object), and/or other attributes. As shown, the information for accessing a set of extensible metadata to apply to the rule (e.g., stored in an "EXmeta [ ]" object) might describe a metadata template identifier (e.g., stored in a "metaID" field), one or more keys for querying the extensible metadata (e.g., stored in a "keys [ ]" object), and/or other attributes.

The associations 446 between the aforementioned data structures serve to facilitate execution of workflows over content objects using sets of extensible metadata assigned to the content objects. Specifically, when a workflow is invoked or transitions to a next step (e.g., next "index" value), the "objID" of the content object (or content objects) associated with the then-current operation of the workflow is identified according to select workflow object attributes 442. This "objID" is mapped to the "objID" depicted in extensible metadata data model 344 to facilitate access to the set of extensible metadata associated with the then-current content object that is subject to the workflow. As indicated by select workflow object attributes 442, the then-current operation of the workflow also references one or more workflow rules identified by a "ruleID" attribute. This "ruleID" is mapped to the "ruleID" of select workflow rule attributes 444 to facilitate access to the attributes of any rules associated with the then-current operation. Each associated rule accesses the operation-specific portion of the extensible metadata using the information stored in the "metaID" field and "keys [ ]" object of select workflow rule attributes 444. As shown in associations 446, this information is then used to query the extensible metadata of the content object (or content objects) associated with the then-current operation to determine one or more workflow responses in accordance with the workflow rules associated with the then-current operation. In some cases, the workflow responses (e.g., stored in a "responses [ ]" object) invoke modifications to one or more values (e.g., stored in a "value" field in a "metadata [ ]" object) in the extensible metadata.

The foregoing discussions include techniques for a user interacting with various metadata templates views to create metadata templates. One embodiment of such metadata template views is disclosed as follows.

Figure 4B:
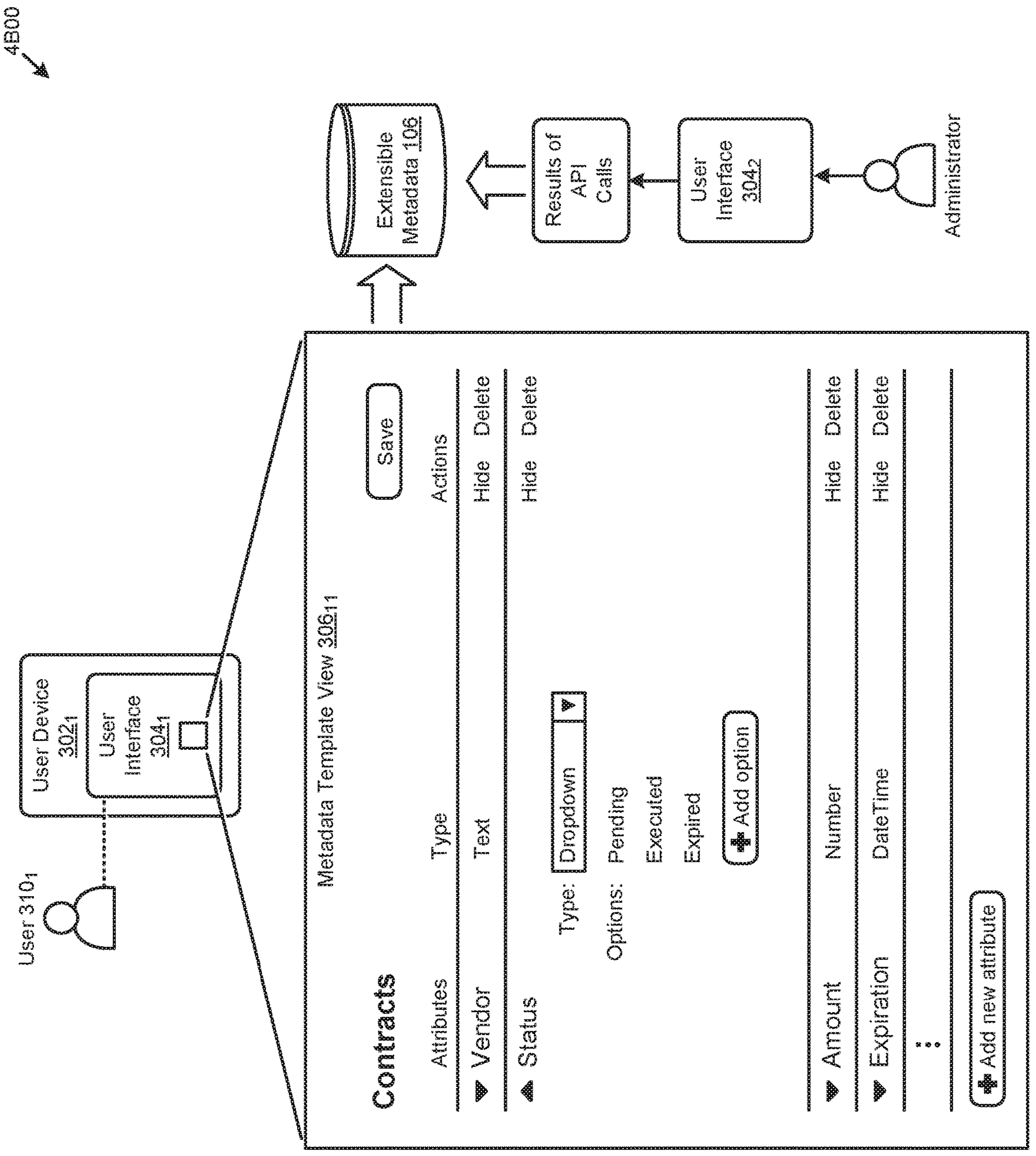
FIG. 4B illustrates a metadata template graphical user interface for creating metadata templates in systems that facilitate associating extensible metadata with content objects, according to an embodiment.

FIG. 4B illustrates a metadata template graphical user interface 4B00 for creating metadata templates in systems that facilitate associating extensible metadata with content objects. As an option, one or more variations of metadata template graphical user interface 4B00 or any aspect thereof may be implemented in the context of the architecture and functionality of the embodiments described herein. The metadata template graphical user interface 4B00 or any aspect thereof may be implemented in any environment.

FIG. 4B illustrates aspects pertaining to managing extensible metadata templates Specifically, the figure is being presented to illustrate an example user interface view that facilitates the creation and management of metadata templates that define the content and structure of certain sets of extensible metadata.

As depicted in FIG. 4B, a metadata template view $\mathbf{306}_{11}$ is presented at user interface $\mathbf{304}_1$ of user device $\mathbf{302}_1$ associated with user $\mathbf{310}_1$. As merely one example, user $\mathbf{310}_1$ might be a workflow administrator or architect with detailed knowledge of a particular workflow and the content objects that are to be subjected to the workflow. In this case, user $\mathbf{310}_1$ may have an interest in creating a metadata template to define the operation-specific extensible metadata to attach to content objects. The values contained in the extensible metadata are used to inform and/or control execution of the workflow over the content objects.

For example, consider a contracts dashboard workflow that is designed to present a dashboard of contract-related content objects to facilitate efficient navigation and/or other actions over the content objects. In this case, user $\mathbf{310}_1$ may interact with metadata template view $\mathbf{306}_{11}$ to create a "Contracts" metadata template. As shown, user $\mathbf{310}_1$ interacts with an "Add new attribute" button to add certain object "Attributes" for a particular contract document to the template that describe a "Vendor," a contract "Status," a contract "Amount," a contract "Expiration," and/or other workflow-specific attributes.

As can be observed in metadata template view $\mathbf{306}_{11}$, user $\mathbf{310}_1$ also specifies the "Type" of object attributes. As one example, the "Status" attribute is a selectable from a user-specified list of options (e.g., "Pending", "Executed", "Expired", etc.) using a dropdown interface element. Upon clicking a "Save" button, the "Contracts" metadata template can then be applied to sets of extensible metadata 106 associated with content objects (e.g., contracts) that are to be the subject of the contracts dashboard workflow. In some cases, the user interface $\mathbf{304}_1$ facilitates further types of object attributes. For example, such object attributes might be specified to comport with (e.g., stored as or cast into) a particular data type, such as, a text data type or a single enum data type, or a multiple enum data type, or a number data type, or a date data type or a time data type, etc.

In some cases, such attributes and/or attribute values might be automatically created and/or populated to correspond to a particular form object, or to correspond to a particular type of document object (e.g., a contract, etc.). In some cases, the automation services that are used to automatically create and/or populate attributes and/or attribute values can be hosted by a third party. For example, a specialized processing service might be defined to parse a form or document and then, based on determinations from the parsing, the service can identify or generate an applicable extensible metadata schema. In some cases, such a service can identify or generate an applicable schema for integrating metadata even when the cloud-based collaboration platform does not provide specific metadata guidelines to the service. Consider for example, an intelligent form field extraction capability configured to extract attributes and values and/or to generate extensible metadata based on particular instances of predefined forms (e.g., a government-provided form, an insurance claim form, etc.). In the foregoing example involving predefined forms, the specialized processing service may receive a XLS specification or an XML DTD or other computer-readable representation of a specification for generating extensible metadata associated with a particular instance of a predefined form or for generating extensible metadata associated with a particular instance of a particular type of content item. The specialized processing service can be further configured to provide the generated extensible metadata and/or its corresponding schema to the cloud-based collaboration platform. In some embodiments, the schema may be wholly or partially predefined by an author of the specialized processing services (e.g., by a third-party developer). In other embodiments, a processing entity associated with the specialized processing service may be configured to generate extensible metadata and/or its corresponding schema by applying rules and/or machine learning techniques.

Further details regarding general approaches to use of specialized processing services are described in Patent Application Ser. No. PCT/US18/55096 "INTEGRATING EXTERNAL DATA PROCESSING TECHNOLOGIES WITH A CLOUD-BASED COLLABORATION PLATFORM", filed on Oct. 9, 2018, which is hereby incorporated by reference in its entirety.

Using controls (e.g., buttons, other widgets) of the user interface, a user or administrator can manage the template. As specific cases, the user interface may support adding/removing and/or hiding/showing, and/or enabling/disabling, and/or deleting attributes. In cases that a particular attribute is deleted, the particular attribute might be merely marked in the metadata as deleted. However, if it is desired to delete the entire set of extensible metadata, an administrator or similarly privileged user can indicate such a deletion. In response, any content objects that are associated with the to-be deleted extensible metadata are marked to reflect the intended deletion. A synchronous or asynchronous clean-up process can be scheduled to cause actual deletion of the extensible metadata.

In some embodiments, any of the foregoing operations can be accomplished through application programming interface call. Specifically, a user interface $\mathbf{304}_2$ can be operated by an administrator. Actions taken at the user interface may cause calls to an API, and results of execution of a particular API call may result in extensible metadata being defined.

The foregoing discussions include techniques for assigning sets of extensible metadata to content objects in accordance with metadata templates created, for example, using one or more metadata template views (e.g., step 224 of FIG. 2), which techniques are disclosed in further detail as follows.

Figure 5:
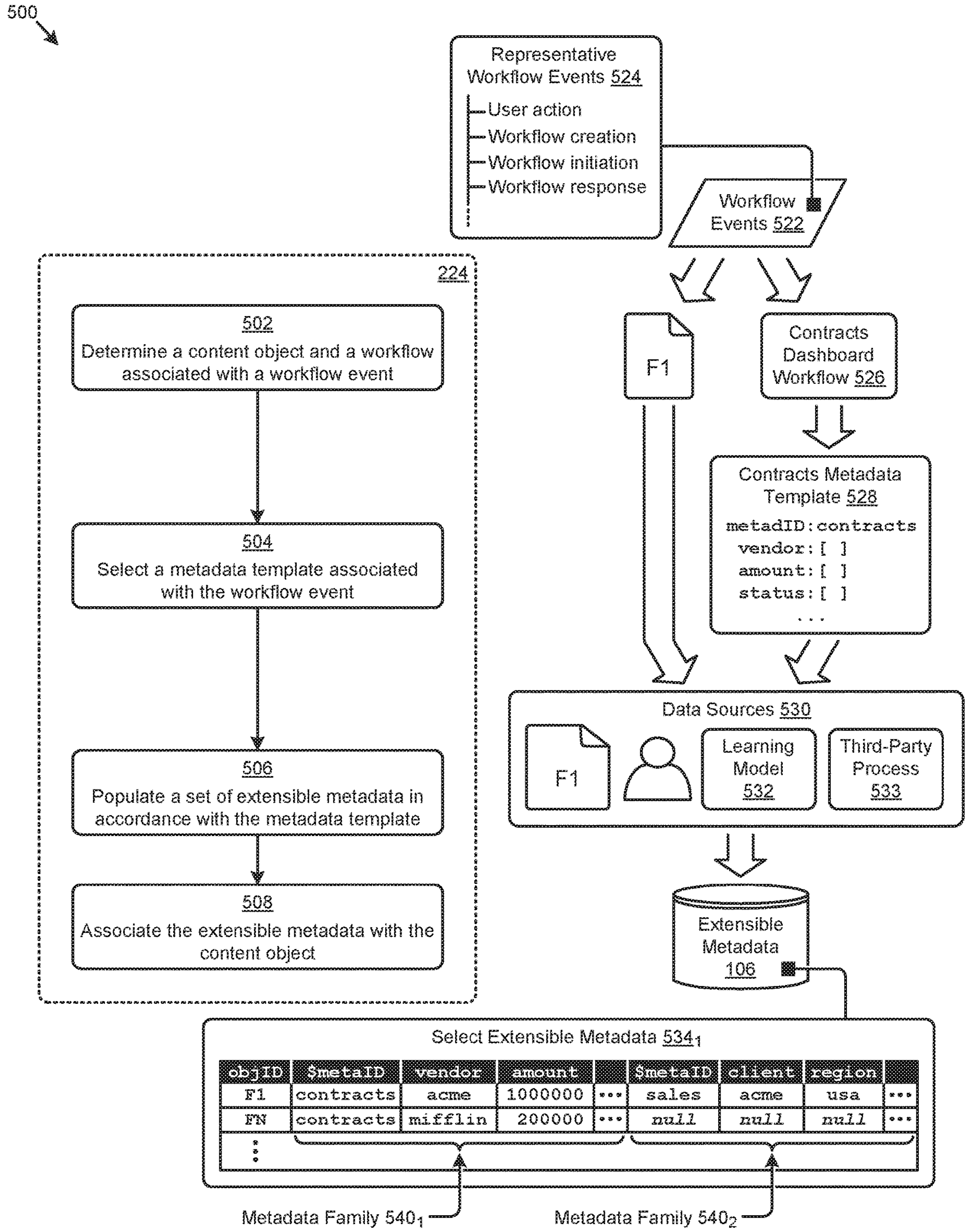
FIG. 5 presents an extensible metadata management technique as implemented in systems that facilitate associating extensible metadata with content objects, according to an embodiment.

FIG. 5 presents an extensible metadata management technique 500 as implemented in systems that facilitate associating extensible metadata with content objects. As an option, one or more variations of extensible metadata management technique 500 or any aspect thereof may be implemented in the context of the architecture and functionality of the embodiments described herein. The extensible metadata management technique 500 or any aspect thereof may be implemented in any environment.

The figure is presented to illustrate one embodiment of certain steps and/or operations that facilitate generation and management of metadata templates. As depicted in the figure, the steps and/or operations are associated with step 224 of FIG. 2. A representative scenario is also shown in the figure to illustrate an example application of this extensible metadata management technique.

Extensible metadata management technique 500 commences by determining a content object and a workflow associated with a workflow event (step 502). As illustrated, for example, a file F1 and a contracts dashboard workflow 526 might be associated with a workflow event from various instances of workflow events 522. As indicated by a set of representative workflow events 524, any of the workflow events 522 might pertain to one or more user actions (e.g., at a user interface) that raises a workflow event, and/or creation and/or enablement of a workflow, initiation of a workflow, a workflow response generated during the execution of a workflow, and/or other operations associated with one or more workflows or workflow operations. In some cases, accessing a content object itself raises a workflow event. Furthermore, when a workflow is being processed, it can happen that some operations of the workflow initiates other workflows and/or determines other content objects that are to be subjected to workflow processing. In some cases, it can happen that an operation of the workflow invokes one or more third-party workflows. For example, a workflow that processes a contract might initiate a document signing workflow that is managed by a third party, possibly at a different domain or possibly using a licensed third-party product. Still other embodiments may raise a workflow event when a user accesses a directory or folder. In some cases, a newly-created content object may be automatically paired with a given workflow, and the act of pairing serves to raise a workflow event.

As shown, a metadata template that corresponds to the workflow associated with a given workflow event is selected (step 504). As can be observed, a contracts metadata template 528 is identified as related to the contracts dashboard workflow 526. Contracts metadata template 528, identified by a "contracts" template identifier, specifies certain operation-specific and/or workflow-specific object attributes (e.g., contract "vendor", contract "status", contract "amount", etc.) that are to be included in any extensible metadata associated with file F1.

A set of extensible metadata is then populated in accordance with the metadata template (step 506) and associated with the content object (step 508). As illustrated in the figure, various instances of data sources 530 are accessed to populate the operation-specific object attributes of contracts metadata template 528 and/or other metadata that constitute the set of extensible metadata. Data sources 530 might include the subject content object (e.g., file F1), data from one or more user inputs (e.g., submitted from a user interface), data from a learning model 532, data from a third-party process 533, and/or data from other data sources. As an example, learning model 532 might facilitate automatic population of certain extensible metadata based at least in part on certain historical and/or then-current user attributes, user collaboration activities (e.g., user-to-user interactions, user-to-content interactions, etc.), workflow responses, workflow object attributes, and/or other information. As another example an external, third-party process 533 might be used to perform optical character recognition over a contract.

Further details regarding general approaches to use of third-party process are described in PCT Application Ser. No. PCT/US18/55096 titled "INTEGRATING EXTERNAL DATA PROCESSING TECHNOLOGIES WITH A CLOUD-BASED COLLABORATION PLATFORM", filed on Oct. 9, 2018, which is hereby incorporated by reference in its entirety.

As depicted in a set of select extensible metadata $\mathbf{534}_1$, the populated extensible metadata values associated with file F1 and the "contracts" metadata template describe a contract type as "vendor" a name of vendor, "acme", and a contract "amount" of "1000000" (e.g., in dollars). As can be observed, file F1 might be associated with other metadata templates (e.g., a "sales" metadata template), and/or other content objects (e.g., file FN) might be associated with extensible metadata corresponding to any of the aforementioned metadata templates. As further indicated in select extensible metadata $\mathbf{534}_1$, some or all of extensible metadata 106 can be stored according to an extensible metadata data model in a schema-less column-oriented data store, such as HBase. In such embodiments, the column families of the extensible metadata in the data store correspond to metadata families (e.g., metadata family $\mathbf{540}_1$ and metadata family $\mathbf{540}_2$) that are populated according to respective instances of metadata templates (e.g., a "contracts" metadata template and a "sales" metadata template).

The foregoing discussions include techniques for executing workflows over content objects based at least in part on sets of extensible metadata that are assigned to the content objects (e.g., step 226 of FIG. 2), which techniques are disclosed in further detail as follows.

Figure 6:
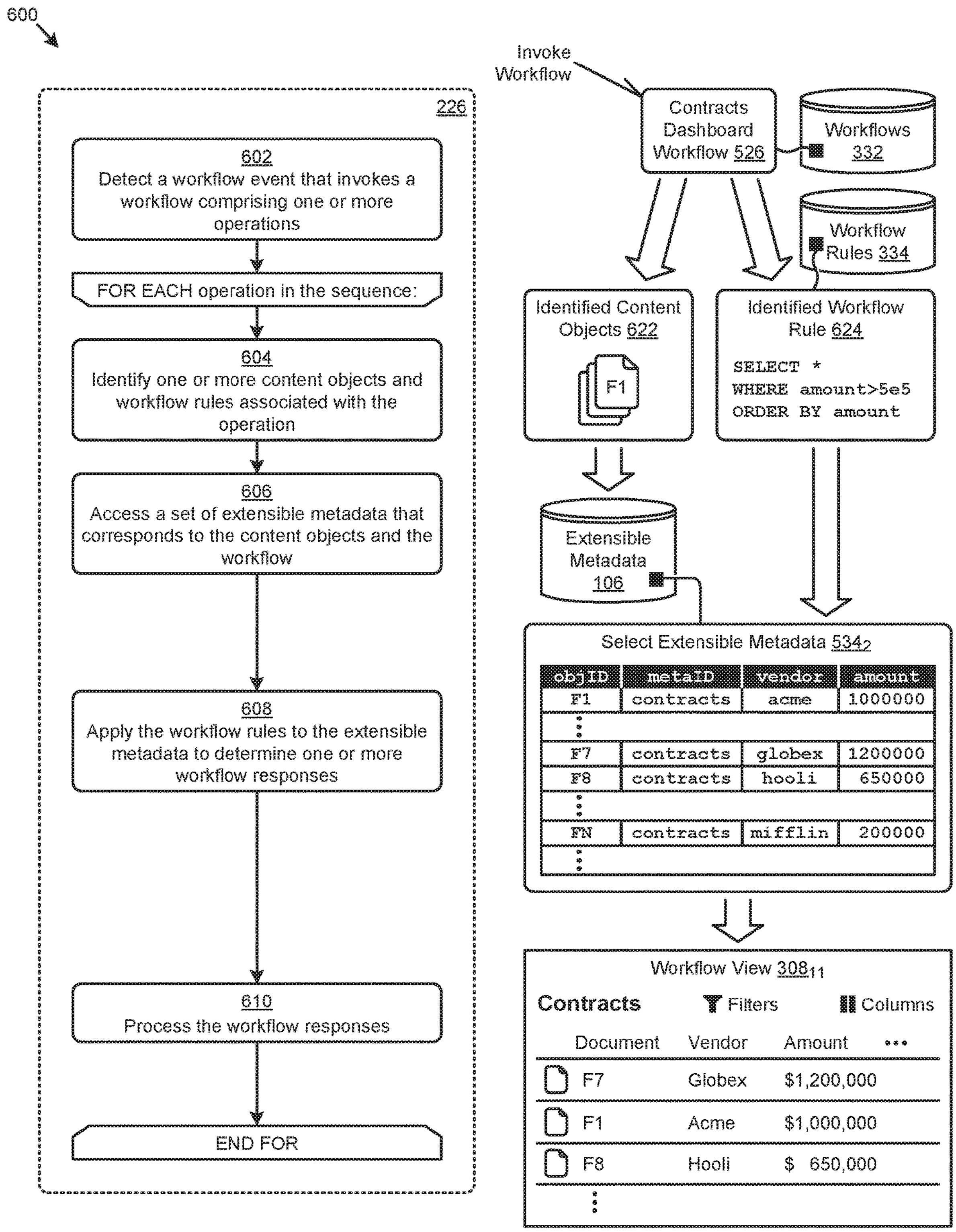
FIG. 6 depicts a workflow execution technique as implemented in systems that facilitate associating extensible metadata with content objects, according to an embodiment.

FIG. 6 depicts a workflow execution technique 600 as implemented in systems that facilitate associating extensible metadata with content objects. As an option, one or more variations of workflow execution technique 600 or any aspect thereof may be implemented in the context of the architecture and functionality of the embodiments described herein. The workflow execution technique 600 or any aspect thereof may be implemented in any environment.

FIG. 6 illustrates aspects pertaining to applying structured sets of extensible metadata to content objects to facilitate the execution of operations (e.g., workflows) associated with the content objects. Specifically, the figure is presented to illustrate one embodiment of certain steps and/or operations that facilitate executing workflows over content objects based at least in part on sets of extensible metadata that are assigned to the content objects. As depicted in the figure, the steps and/or operations are associated with step 226 of FIG. 2. A representative scenario is also shown in the figure to illustrate an example application of workflow execution technique 600.

Workflow execution technique 600 commences by detecting a workflow event that invokes a workflow comprising one or more operations (step 602). For example, a workflow event that invokes the contracts dashboard workflow 526 from workflows 332 might be detected. For each operation (e.g., executed in sequence) of the workflow, one or more content objects and workflow rules associated with the operation are identified (step 604). As merely one example, a set of identified content objects 622 associated with an operation of the contracts dashboard workflow 526 might include file F1 and other files and/or content objects. As earlier described, identified content objects 622 might be identified in the information associated with the operation as codified in a workflow object describing the contracts dashboard workflow 526. As can be observed, an identified workflow rule 624 from workflow rules 334 is also identified as being associated with the operation. As depicted in a set of pseudo code, identified workflow rule 624 pertains to a query of the extensible metadata associated with identified content objects 622 that selects any of the content objects (e.g., contracts) having an "amount" attribute that is greater than "5e5" (e.g., 500,000) and returns the query results ordered by the "amount" attribute (e.g., from largest to smallest).

Workflow execution technique 600 continues by accessing a set of extensible metadata that corresponds to the content objects and the workflow (step 606). A set of select extensible metadata $\mathbf{534}_2$ represents the portion of extensible metadata 106 that pertains to identified content objects 622. The identified workflow rule or rules are applied to the extensible metadata accessed at extensible metadata 106 to determine one or more workflow responses (step 608). For example, the aforementioned query of identified workflow rule 624 is applied to the portion of extensible metadata 106 pertaining to identified content objects 622 to determine the workflow responses. In this and other scenarios, workflow responses can include collaboration activities such as requests or suggestions to share the content object, actions to move the content, actions to assign new collaborators, actions to assign new metadata, actions to update metadata, actions to create tasks, actions that raise new events that in turn invoke further workflows, actions that invoke a workflow in a third party's flow, actions that cause display of a user interface, actions that invoke synchronous processing, actions that invoke asynchronous processing, actions that result in issuance of messages, actions that perform searching and/or sorting, waiting for conclusion of certain operations of the workflow, etc. In the depicted example, carrying out the workflow response (step 610) results in a workflow view 308$_{11}$. As depicted in workflow view 308$_{11}$, an operation or operations of the contracts dashboard workflow 526 serves to present a list of contracts over $500,000, which contracts are sorted and displayed in decreasing order by amount.

Additional Embodiments of the Disclosure

Additional Practical Application Examples

Figure 7A:
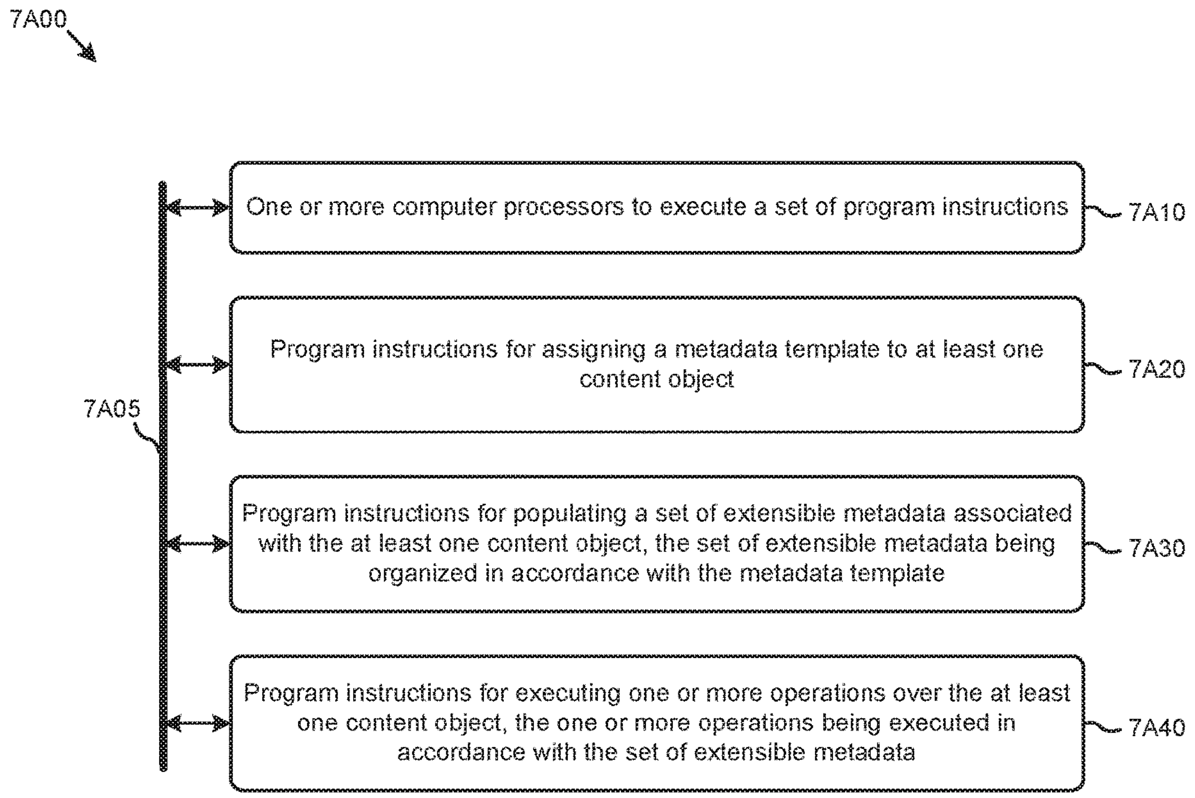
FIG. 7A and FIG. 7B depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. This and other embodiments present particular arrangements of elements that, individually or as combined, serve to form improved technological processes that pertain to efficiently associating extensible metadata with content objects in highly collaborative content management systems. The partitioning of system 7A00 is merely illustrative and other partitions are possible. As an option, the system 7A00 may be implemented in the context of the architecture and functionality of the embodiments described herein. Of course, however, the system 7A00 or any operation therein may be carried out in any desired environment.

The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with any other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising one or more computer processors to execute a set of program code instructions (module 7A10) and modules for accessing memory to hold program code instructions to perform: assigning a metadata template to a content object (module 7A20); populating a set of extensible metadata associated with the content object, the set of extensible metadata being organized in accordance with the metadata template (module 7A30); and executing one or more operations over the content object, the one or more operations being executed in accordance with the set of extensible metadata (module 7A40).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

Figure 7B:
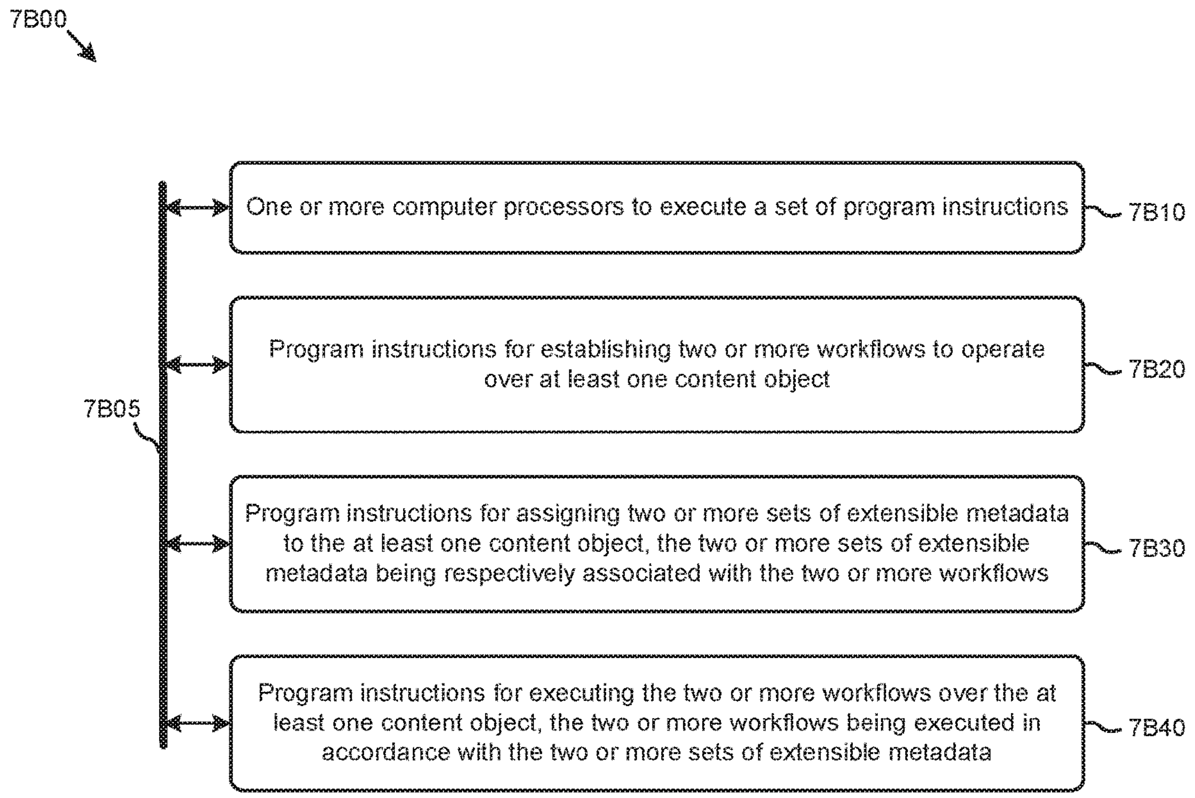

FIG. 7B depicts a system 7B00 as an arrangement of computing modules that are interconnected so as to operate cooperatively to implement certain of the herein-disclosed embodiments. The partitioning of system 7B00 is merely illustrative and other partitions are possible. As an option, the system 7B00 may be implemented in the context of the architecture and functionality of the embodiments described herein. Of course, however, the system 7B00 or any operation therein may be carried out in any desired environment.

The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with any other operations over communication path 7B05. The modules of the system can, individually or in combination, perform method operations within system 7B00. Any operations performed within system 7B00 may be performed in any order unless as may be specified in the claims.

The shown embodiment implements a portion of a computer system, presented as system 7B00, comprising one or more computer processors to execute a set of program code instructions (module 7B10) and modules for accessing memory to hold program code instructions to perform: establishing two or more workflows to operate over content object (module 7B20); assigning two or more sets of extensible metadata to the content object, the two or more sets of extensible metadata being respectively associated with the two or more workflows (module 7B30); and executing the two or more workflows over the content object, the two or more workflows being executed in accordance with the two or more sets of extensible metadata (module 7B40).

System Architecture Overview

Additional System Architecture Examples

Figure 8A:
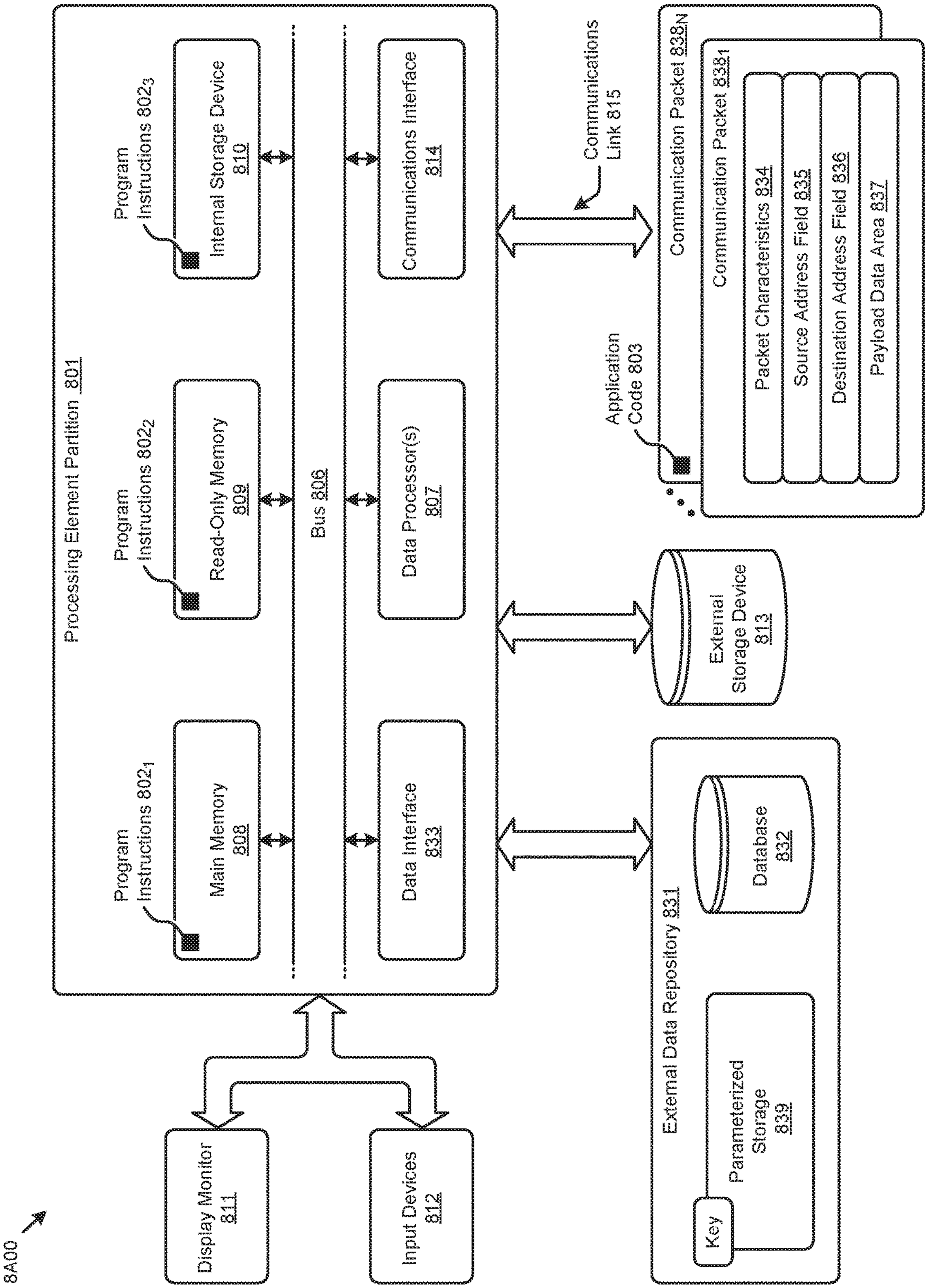
FIG. 8A and FIG. 8B present block diagrams of computer system architectures having components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. Computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program instructions contained in a memory. Such instructions (e.g., program instructions 802$_1$, program instructions 802$_2$, program instructions 802$_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of communications interface 814 may comprise one or more networking ports that are configurable (e.g., pertaining to speed, protocol, physical layer characteristics, media access characteristics, etc.) and any particular instance of communications interface 814 or port thereto can be configured differently from any other particular instance. Portions of a communication protocol can be carried out in whole or in part by any instance of communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

Communications link 815 can be configured to transmit (e.g., send, receive, signal, etc.) any types of communications packets (e.g., communication packet $\mathbf{838}_1$, communication packet $\mathbf{838}_N$) comprising any organization of data items. The data items can comprise a payload data area 837, a destination address 836 (e.g., a destination IP address), a source address 835 (e.g., a source IP address), and can include various encodings or formatting of bit fields to populate packet characteristics 834. In some cases, the packet characteristics include a version identifier, a packet or payload length, a traffic class, a flow label, etc. In some cases, payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term “logic” shall mean any combination of software or hardware that is used to implement all or part of the disclosure.

The term “computer readable medium” or “computer usable medium” as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of a computer system 8A00. According to certain embodiments of the disclosure, two or more instances of computer system 8A00 coupled by a communications link 815 (e.g., LAN, public switched telephone network, or wireless network) may perform the sequence of instructions required to practice embodiments of the disclosure using two or more instances of components of computer system 8A00.

Computer system 8A00 may transmit and receive messages such as data and/or instructions organized into a data structure (e.g., communications packets). The data structure can include program instructions (e.g., application code 803), communicated through communications link 815 and communications interface 814. Received program instructions may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

Processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to extensible metadata for shared content objects. A module may include one or more state machines and/or combinational logic used to implement or facilitate the operational and/or performance characteristics pertaining to using extensible metadata and workflows over shared content objects.

Various implementations of database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of extensible metadata for shared content objects). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to extensible metadata for shared content objects, and/or for improving the way data is manipulated when performing computerized operations pertaining to applying structured sets of extensible metadata to content objects so as to facilitate the execution of operations (e.g., workflows) associated with the content objects.

Figure 8B:
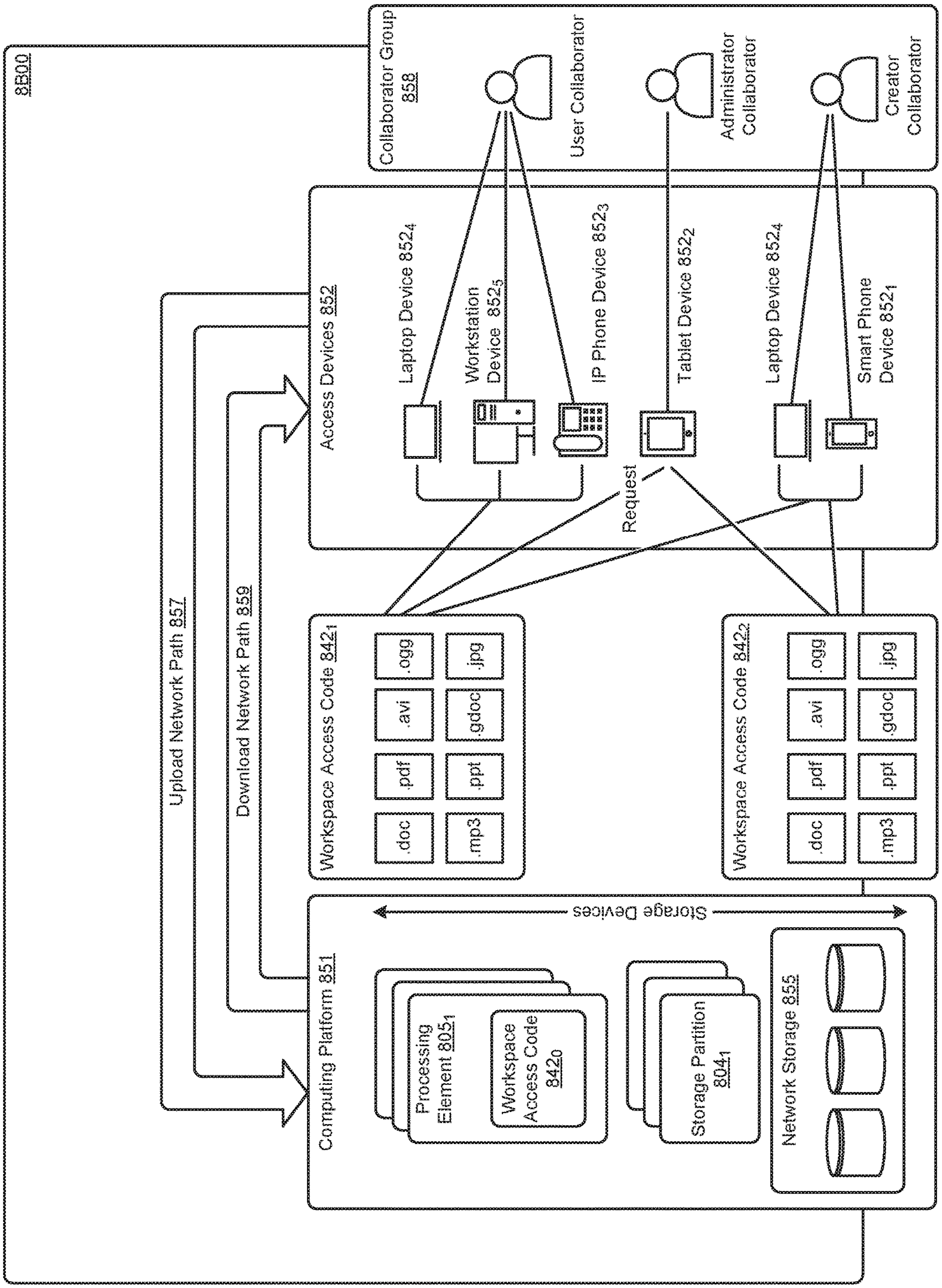

FIG. 8B depicts a block diagram of an instance of a cloud-based environment 8B00. Such a cloud-based environment supports access to workspaces through the execution of workspace access code (e.g., workspace access code $\mathbf{842}_0$, workspace access code $\mathbf{842}_1$, and workspace access code $\mathbf{842}_2$). Workspace access code can be executed on any of access devices 852 (e.g., laptop device $\mathbf{852}_4$, workstation device $\mathbf{852}_5$, IP phone device $\mathbf{852}_3$, tablet device $\mathbf{852}_2$, smart phone device $\mathbf{852}_1$, etc.), and can be configured to access any type of object. Strictly as examples, such objects can be folders or directories or can be files of any filetype. A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 851, including in a middleware setting. As shown, a portion of the workspace access code resides in and can be executed on one or more processing elements (e.g., processing element 8051). The workspace access code can interface with storage devices such as networked storage 855. Storage of workspaces and/or any constituent files or objects, and/or any other code or scripts or data can be stored in any one or more storage partitions (e.g., storage partition $\mathbf{804}_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for managing content object metadata, the method comprising:

associating each object of a plurality of objects stored on a system with a global metadata schema and one or more respective portions of a set of extensible metadata, wherein the global metadata schema is applied to the each object to associate global metadata with the each object;

associating a plurality of metadata templates with an object of the plurality of metadata templates, wherein each of the plurality of metadata templates corresponds to a respective portion in a set of extensible metadata, the plurality of metadata templates comprising a first metadata template for the object that is collaborated upon by first multiple users in a first workflow and a second metadata template for the object that is collaborated upon by second multiple users in a second workflow, the first metadata template is specific to a first pair comprising the object and the first workflow and is distinct from the second metadata template that is specific to a second pair comprising the object and the second workflow, and the first metadata template and the second metadata template are respectively selected based at least in part upon a first operation in the first workflow and a second operation in the second workflow so as to be distinct from one another;

determining whether a request to operate on the object is to operate on the object in the first workflow or in the second workflow;

in response to a first determination result that the request is to operate on the object in the first workflow, attaching a first respective portion of the set of extensible metadata to the object by using at least the first metadata template, rather than updating the global metadata schema to accommodate the first operation in the first workflow; and in response to a second determination result that the request is to operate on the object in the second workflow on the object, attaching a second respective portion of the set of extensible metadata to the object using at least the second metadata template, rather than updating the global metadata schema to accommodate the second operation in the second workflow, wherein at least a portion of the request constitutes a workflow that comprises conditional logic based at least in part on a second set of one or more second attributes corresponding to the second metadata template and attached to the object in response to the request to operate on the object in the second workflow, and a first attribute value for a first set of one or more first attributes corresponding to the first metadata template and attached to the object in response to the request to operate on the object in the first workflow or a second attribute value for the second set is stored in a schema-less store.

2. The method of claim 1, wherein at least a portion of the first set of one or more first attributes is applied to one or more workflow rules to determine one or more workflow responses associated with the first workflow.

3. The method of claim 1, wherein the first or the second metadata template comprises at least one of a metadata template identifier or a metadata template type, a first set of one or more first attributes corresponding to the first metadata template and attached to the object in response to the request to operate on the object in the first workflow or a second set of one or more second attributes corresponding to the second metadata template and attached to the object in response to the request to operate on the object in the second workflow is centrally stored in a schema-less store, and one or more global attributes are structured according to the global metadata schema and is uniform over the plurality of objects.

4. The method of claim 1, further comprising determining a first structure or a first organization of the set of extensible metadata at least by applying the first metadata template to a metadata model to which both the first and the second metadata templates are applied, wherein at least an attribute value for at least a portion of the first set of one or more first attributes is derived from one or more data sources, the at least the portion of the first set of one or more first attributes comprises one or more operations and object specific metadata.

5. The method of claim 4, wherein the one or more data sources comprise at least one of the object, one or more user inputs, or one or more learning models, and the one or more operations and object specific metadata are specific to a particular pair of the object and one or more particular operations performed on the object for the request or to the first or the second workflow for facilitating performing the one or more particular operations on the object or facilitating an execution of the first or the second workflow.

6. The method of claim 1, wherein a first set of one or more first attributes corresponding to the first metadata template is automatically attached to the object in response to the request to operate on the object in the first workflow by one or more computing entities, a first attribute of the first set specific to the first pair of the object and the first workflow and a second attribute of a second set specific to the second pair of the object and the second workflow are identified based at least in part upon the global metadata schema according to which a global attribute is structured, and the first set or the second set is attached without having to extract, from the object, the first attribute value for attaching the first set or the second attribute value for attaching the second set.

7. The method of claim 1, wherein an attribute value of a first set of one or more first attributes corresponding to the first metadata template is modified in response to executing at least one of a plurality of operations in the first or the second workflow, a first portion of the first set of one or more first attributes and the first metadata template are attached to the object in response to the request to operate on the object in the first workflow, a second portion of the first set of one or more first attributes is attached to the first workflow, and the first portion is different from the second portion.

8. The method of claim 1, wherein a first set of one or more first attributes attached to the object in response to the request to operate on the object in the first workflow is organized according to a first metadata data model that is different from a second metadata model according to which second set of one or more second attributes that is attached to the object in response to the request to operate on the object in the second workflow and is organized and is further different from the global metadata schema according to which global metadata that is uniformly applied to different content objects in the multiple workflows.

9. The method of claim 1, further comprising:
- modifying a first set of one or more first attributes, which corresponds to the first metadata template and is attached to the object in response to the request to operate on the object in the first workflow, according to a first response generated by the first workflow; and
- modifying a second set of one or more second attributes, which corresponds to the second metadata template and is attached to the object in response to the request to operate on the object in the second workflow, according to a second response generated by the second workflow, wherein
  the object is maintained at a content management system for collaboration, by the first and second multiple users, on the object, wherein the collaboration includes viewing and editing the object.

10. A non-transitory computer readable medium having stored thereon a sequence of instructions which, when executed by a processor causes a set of acts for managing content object metadata, the set of acts comprising:
- associating each object of a plurality of objects stored on a system with a global metadata schema and one or more respective portions of a set of extensible metadata, wherein the global metadata schema is applied to the each object to associate global metadata with the each object;
- associating a plurality of metadata templates with an object of the plurality of metadata templates, wherein each of the plurality of metadata templates corresponds to a respective portion in a set of extensible metadata,
  - the plurality of metadata templates comprising a first metadata template for the object that is collaborated upon by first multiple users in a first workflow and a second metadata template for the object that is collaborated upon by second multiple users in a second workflow,
  - the first metadata template is specific to a first pair comprising the object and the first workflow and is distinct from the second metadata template that is specific to a second pair comprising the object and the second workflow, and
  - the first metadata template and the second metadata template are selected based at least in part upon a first operation in the first workflow and a second operation in the second workflow so as to be distinct from one another;
- determining whether a request to operate on the object is to operate on the object in the first workflow or in the second workflow;
- in response to a first determination result that the request is to operate on the specific object in the first workflow, attaching a first respective portion of the set of extensible metadata to the object by using at least the first metadata template, rather than updating the global metadata schema to accommodate the first operation in the first workflow; and
- in response to a second determination result that the request is to operate on the object in the second workflow on the object, attaching a second respective portion of the set of extensible metadata to the object using at least the second metadata template, rather than updating the global metadata schema to accommodate the second operation in the second workflow, wherein at least a portion of the request constitutes a workflow that comprises conditional logic based at least in part on a second set of one or more second attributes corresponding to the second metadata template and attached to the object in response to the request to operate on the object in the second workflow, and
  - a first attribute value for a first set of one or more first attributes corresponding to the first metadata template and attached to the object in response to the request to operate on the object in the first workflow or a second attribute value for the second set is stored in a schema-less store.

11. The non-transitory computer readable medium of claim 10, wherein at least a portion of the first set of one or more first attributes is applied to one or more workflow rules to determine one or more workflow responses associated with the first workflow.

12. The non-transitory computer readable medium of claim 10, wherein the first or the second metadata template comprises at least one of a metadata template identifier or a metadata template type, first set of one or more first attributes corresponding to the first metadata template and attached to the object in response to the request to operate on the object in the first workflow or second set of one or more second attributes corresponding to the second metadata template and attached to the object in response to the request to operate on the object in the second workflow is centrally stored in a schema-less store, and one or more global attributes are structured according to the global metadata schema and is uniform over the plurality of objects.

13. The non-transitory computer readable medium of claim 10, wherein at least an attribute value for at least a portion of a first set of one or more first attributes corresponding to the first metadata template and attached to the object in response to the request to operate on the object in the first workflow is derived from one or more data sources, the at least the portion of the first set of one or more first attributes comprises operation-specific and object-specific metadata.

14. The non-transitory computer readable medium of claim 13, wherein the one or more data sources comprise at least one of the object, one or more user inputs, or one or more learning models, and the operation and content object specific metadata are specific to a particular pair of the object and one or more particular operations performed on the object for the request or to the first or the second workflow for facilitating performing the one or more particular operations on the object or facilitating an execution of the first or the second workflow.

15. The non-transitory computer readable medium of claim 10, wherein a first set of one or more first attributes corresponding to the second metadata template and attached to the object in response to the request to operate on the object in the second workflow is automatically populated by one or more computing entities, a first attribute of the first set specific to the first pair of the object and the first workflow and the second attribute specific to the second pair of the object and the second workflow are identified based at least in part upon the global metadata schema according to which a global attribute is structured, and the first set or the second set is attached without having to extract, from the object, the first attribute value for attaching the first set of one or more first attributes or the second attribute value for attaching the second set of one or more first attributes.

16. The non-transitory computer readable medium of claim 10, wherein an attribute value of a first set of one or more first attributes corresponding to the first metadata template and attached to the object in response to the request to operate on the object in the first workflow is modified in response to executing at least one of a plurality of operations in the first or the second workflow, a first portion of the first set of one or more first attributes and the first metadata template are attached to the object, a second portion of the first set of one or more first attributes is attached to the first workflow, and the first portion is different from the second portion.

17. A system for managing content object metadata, the system comprising:

a non-transitory storage medium having stored thereon a sequence of instructions; and a processor that executes the sequence of instructions to cause a set of acts comprising, associating each object of a plurality of objects stored on a system with a global metadata schema and one or more respective portions of a set of extensible metadata, wherein the global metadata schema is applied to the each object to associate global metadata with the each object;

associating a plurality of metadata templates with an object of the plurality of metadata templates, wherein each of the plurality of metadata templates corresponds to a respective portion in a set of extensible metadata, the plurality of metadata templates comprising a first metadata template for the object that is collaborated upon by first multiple users in a first workflow and a second metadata template for the object that is collaborated upon by second multiple users in a second workflow, the first metadata template is specific to a first pair comprising the object and the first workflow and is distinct from the second metadata template that is specific to a second pair comprising the object and the second workflow, and the first metadata template and the second metadata template are selected based at least in part upon a first operation in the first workflow and a second operation in the second workflow so as to be distinct from one another;

determining whether a request to operate on the object is to operate on the object in the first workflow or in the second workflow;

in response to a first determination result that the request is to operate on the object in the first workflow, attaching a first respective portion of the set of extensible metadata to the object by using at least the first metadata template, rather than updating the global metadata schema to accommodate the first operation in the first workflow; and in response to a second determination result that the request is to operate on the object in the second workflow on the object, attaching a second respective portion of the set of extensible metadata to the object using at least the second metadata template, rather than updating the global metadata schema to accommodate the second operation in the second workflow, wherein at least a portion of the request constitutes a workflow that comprises conditional logic based at least in part on a second set of one or more second attributes corresponding to the second metadata template and attached to the object in response to the request to operate on the object in the second workflow, and a first attribute value for a first set of one or more first attributes corresponding to the first metadata template and attached to the object in response to the request to operate on the object in the first workflow or a second attribute value for the second set is stored in a schema-less store.

18. A method for managing content object metadata, the method comprising:

associating each object of a plurality of objects stored on a system with a global metadata schema and one or more respective portions of a set of extensible metadata, wherein the global metadata schema is applied to the each object to associate global metadata with the each object;

associating a plurality of metadata templates with an object of the plurality of metadata templates, wherein each of the plurality of metadata templates corresponds to a respective portion in a set of extensible metadata, the plurality of metadata templates comprising a first metadata template for the object that is collaborated upon by first multiple users in a first workflow and a second metadata template for the object that is collaborated upon by second multiple users in a second workflow, the first metadata template is specific to a first pair comprising the object and the first workflow and corresponds to a first set of one or more first attributes and is distinct from the second metadata template that is specific to a second pair comprising the object and the second workflow and corresponds to a second set of one or more second attributes, and the first metadata template and the second metadata template are respectively selected based at least in part upon a first operation in the first workflow and a second operation in the second workflow so as to be distinct from one another;

determining whether a request to operate on the object is to operate on the object in the first workflow or in the second workflow;

in response to a first determination result that the request is to operate on the object in the first workflow, attaching a first respective portion of the set of extensible metadata to the object by using at least the first metadata template, rather than updating the global metadata schema, to accommodate the first operation in the first workflow; and in response to a second determination result that the request is to operate on the object in the second workflow, attaching a second respective portion of the set of extensible metadata to the object using at least the second metadata template, rather than updating the global metadata schema, to accommodate the second operation in the second workflow; and in response to the request, facilitating execution of the first workflow by using at least the first set of the one or more first attributes that has been attached to the object and execution of the second workflow using at least the second set of the one or more second attributes, which is also attached to the object, wherein at least one attribute of the first set of one or more first attributes or the second set of one or more second attributes is organized in accordance with a metadata data model, the at least one attribute comprises an operation-specific and object-specific attribute, and a first attribute value for the first set or a second attribute value for the second set is stored in a schema-less store.

19. The method of claim 18, wherein the metadata data model comprises one or more model attributes associated with one or more metadata templates, and the operation-specific and object-specific metadata is specific to a particular pair of the object and one or more operations performed on the object or to at least one of the first or the second workflow for facilitating performing the one or more operations on the object or facilitating an execution of the at least one of the first or the second workflow.

20. The method of claim 18, wherein at least a portion of the first set or the second set is derived from one or more data sources, and the first set assigned to the first pair comprising the object and the first workflow and the second set assigned to the second pair comprising the object and the second workflow are identified based at least in part upon the global metadata schema according to which global attributes are structured.

21. The method of claim 20, wherein the one or more data sources comprise at least one of the object, one or more user inputs, or one or more learning models, a first portion of the first set and the first metadata template for the first workflow are attached to the object, a second portion of the first set is attached to or associated with the first workflow, the first portion is different from the second portion, and the first set of one or more first attributes or the second set of one or more second attributes is attached without having to extract, from the object, a first attribute value for populating the first set of one or more first attributes or a second attribute value for populating the second set of one or more second attributes.

22. The method of claim 18, wherein at least a portion of the first set or the second set is applied to at least one workflow rule to determine at least one workflow response associated with the first or the second workflow, and the first set and the second set are organized in a schema-less store, and global attributes are structured according to the global metadata schema.

23. The method of claim 18, wherein at least a portion of the first set or the second set is automatically populated by one or more computing entities that retrieve the at least the portion from a schema-less central store and respectively populate the at least the portion into the first metadata template for the first workflow and the second metadata template for the second workflow.

24. The method of claim 18, further comprising:

modifying at least a first attribute value in a first portion of the first set of one or more first attributes according to a first response generated by execution of the first workflow; and modifying at least a second attribute value in a second portion of the second set of one or more second attributes according to a second response generated by execution of the second workflow.

25. The method of claim 24, wherein at least one of the first and the second workflows comprises one or more operations that use at least a portion of the first and the second sets, and different operations in the first and the second workflows performed on the object correspond to different sets of one or more attributes of the first and the second sets.

26. The method of claim 18, wherein the object is maintained at a content management system, the first and the second sets are centrally maintained in a schema-less store, and global attributes are structured according to the global metadata schema.

* * * * *